(12) United States Patent
Fedorov et al.

(10) Patent No.: US 12,240,500 B2
(45) Date of Patent: Mar. 4, 2025

(54) METHOD OF AND SYSTEM FOR PREDICTING A MANEUVER OF AN OBJECT

(71) Applicant: Direct Cursus Technology L.L.C, Dubai (AE)

(72) Inventors: Sergey Dmitrievich Fedorov, Saratov (RU); Andrey Alekseevich Nedoluzhko, Moscow (RU); Daniil Vladimirovich Melnichenko, Minsk (BY)

(73) Assignee: Y.E. Hub Armenia LLC, Yerevan (AM)

( * ) Notice: Subject to any disclaimer, the term of this patent is extended or adjusted under 35 U.S.C. 154(b) by 0 days.

(21) Appl. No.: 18/437,881

(22) Filed: Feb. 9, 2024

(65) Prior Publication Data

US 2024/0182080 A1    Jun. 6, 2024

Related U.S. Application Data

(63) Continuation of application No. 17/587,641, filed on Jan. 28, 2022, now Pat. No. 12,024,204.

(30) Foreign Application Priority Data

Apr. 9, 2021    (RU) .......................... RU2021109878

(51) Int. Cl.
*B60W 30/18*    (2012.01)
*B60W 30/14*    (2006.01)
(Continued)

(52) U.S. Cl.
CPC ...... *B60W 60/0027* (2020.02); *B60W 30/143* (2013.01); *B60W 30/18163* (2013.01);
(Continued)

(58) Field of Classification Search
CPC .......... B60W 60/0027; B60W 30/143; B60W 30/18163; B60W 40/072; B60W 2552/53;
(Continued)

(56) References Cited

U.S. PATENT DOCUMENTS

| | | |
|---|---|---|
| 8,244,408 B2 | 8/2012 | Lee et al. |
| 9,026,356 B2 | 5/2015 | Tan |

(Continued)

FOREIGN PATENT DOCUMENTS

| | | |
|---|---|---|
| WO | 2017134058 A1 | 8/2017 |
| WO | 2020089311 A1 | 5/2020 |

(Continued)

*Primary Examiner* — Ashley L Redhead, Jr.
(74) *Attorney, Agent, or Firm* — BCF LLP

(57) ABSTRACT

Methods and devices for generating data for controlling a Self-Driving Car (SDC) are disclosed. The method includes: receiving a section of a road map corresponding to surroundings of the SDC and at least one object, generating predicted trajectories including potential future location points of the at least one object, mapping the potential future location points on the section of the road map, computing a score for each of the potential future location points, computing an aggregated score from the scores corresponding to the potential future location points, and based on the aggregated score, determining a predicted location of the at least one object at the future instance of time.

18 Claims, 6 Drawing Sheets

(51) Int. Cl.
  *B60W 40/072* (2012.01)
  *B60W 60/00* (2020.01)
  *G01C 21/00* (2006.01)

(52) U.S. Cl.
  CPC ....... *B60W 40/072* (2013.01); *G01C 21/3889* (2020.08); *B60W 2552/53* (2020.02); *B60W 2554/4044* (2020.02)

(58) Field of Classification Search
  CPC ....... B60W 2554/4044; G01C 21/3889; G01S 13/726; G01S 13/865; G01S 13/867; G01S 17/66; G01S 17/86; G01S 17/931; G01S 2013/9316; G01S 2013/9323; G01S 2013/93273; G01S 13/931; G08G 1/166; G06V 20/588
  See application file for complete search history.

(56) References Cited

U.S. PATENT DOCUMENTS

| | | | |
|---|---|---|---|
| 10,030,978 | B2 | 7/2018 | Vladimerou |
| 10,173,685 | B2 | 1/2019 | Schaper et al. |
| 10,317,902 | B2 | 6/2019 | Nilsson et al. |
| 10,345,815 | B2 | 7/2019 | Lv et al. |
| 10,553,117 | B1 | 2/2020 | Johnson et al. |
| 10,611,371 | B2 | 4/2020 | Kusano et al. |
| 10,761,535 | B2 | 9/2020 | Chen et al. |
| 10,783,789 | B2 | 9/2020 | Mizutani |
| 10,793,162 | B2 | 10/2020 | Yoon |
| 10,800,416 | B2 | 10/2020 | Aine |
| 12,055,401 | B1 * | 8/2024 | Fowe .................. G08G 1/0112 |
| 2011/0313665 | A1 | 12/2011 | Lueke et al. |
| 2018/0174443 | A1 * | 6/2018 | Fowe .................. G08G 1/012 |
| 2018/0257647 | A1 | 9/2018 | Jurca et al. |
| 2019/0047571 | A1 | 2/2019 | Ulbrich et al. |
| 2019/0234745 | A1 | 8/2019 | Lee |
| 2019/0241184 | A1 * | 8/2019 | Hayashi .................. G08G 1/167 |
| 2019/0329777 | A1 | 10/2019 | Rajab et al. |
| 2020/0086859 | A1 | 3/2020 | McGill et al. |
| 2020/0114910 | A1 | 4/2020 | Han et al. |
| 2020/0172093 | A1 | 6/2020 | Kum et al. |
| 2020/0189580 | A1 | 6/2020 | Schmidt et al. |
| 2020/0189581 | A1 | 6/2020 | Yang et al. |
| 2020/0211394 | A1 | 7/2020 | King et al. |
| 2020/0241546 | A1 | 7/2020 | Sun et al. |
| 2020/0247406 | A1 | 8/2020 | Huang |
| 2020/0307565 | A1 | 10/2020 | Ward et al. |
| 2021/0237769 | A1 | 8/2021 | Ostafew |
| 2021/0269057 | A1 * | 9/2021 | Balu .................. G01C 21/3617 |
| 2021/0271995 | A1 * | 9/2021 | Balu .................. G01S 5/0252 |
| 2021/0347377 | A1 | 11/2021 | Siebert et al. |
| 2022/0105926 | A1 * | 4/2022 | Zhang .................. G08G 1/162 |
| 2022/0163970 | A1 | 5/2022 | Chen et al. |
| 2022/0171066 | A1 | 6/2022 | Li et al. |
| 2022/0289372 | A1 * | 9/2022 | Pescaru .................. G06T 7/20 |
| 2022/0315000 | A1 * | 10/2022 | Wray .................. B60W 60/001 |
| 2023/0061784 | A1 * | 3/2023 | Agrawal .................. G06V 20/56 |
| 2023/0135159 | A1 * | 5/2023 | Heyl .................. G05D 1/0055 701/23 |
| 2023/0192147 | A1 | 6/2023 | Raina et al. |

FOREIGN PATENT DOCUMENTS

| | | |
|---|---|---|
| WO | 2020127010 A1 | 6/2020 |
| WO | 2020146428 A1 | 7/2020 |
| WO | 2021062594 A1 | 4/2021 |

* cited by examiner

METHOD OF AND SYSTEM FOR PREDICTING A MANEUVER OF AN OBJECT

CROSS-REFERENCE

The present application is a continuation of U.S. patent application Ser. No. 17/587,641, filed Jan. 28, 2022, entitled "METHOD OF AND SYSTEM FOR PREDICTING A MANEUVER OF AN OBJECT", which claims priority to Russian Patent Application No. 2021109878, entitled "Method of and System for Predicting a Maneuver of an Object", filed Apr. 9, 2021, the entirety of which is incorporated herein by reference.

FIELD OF TECHNOLOGY

The present technology relates to self-driving cars and, specifically, to methods and systems for predicting a maneuver of an object.

BACKGROUND

Several computer-based navigation systems that are configured for aiding navigation and/or control of vehicle have been proposed and implemented in the prior art. These systems range from more basic map-aided localization-based solutions—i.e. use of a computer system to assist a driver in navigating a route from a starting point to a destination point; to more complex ones—computer-assisted and/or driver-autonomous driving systems.

Some of these systems are implemented as what is commonly known as a "cruise control" system. Within these systems, the computer system boarded on the vehicles maintains a user-set speed of the vehicle. Some of the cruise control system implement an "intelligent distance control" system, whereby the user can set up a distance to a potential car in front (such as, select a value expressed in a number of vehicles) and the computer system adjusts the speed of the vehicle at least in part based on the vehicle approaching the potential vehicle in front within the predefined distance. Some of the cruise control systems are further equipped with collision control system, which systems upon detection of the vehicle (or other obstacle) in front of the moving vehicle, slow down or stop the vehicle.

Some of the more advanced systems provide for a fully autonomous driving of the vehicle without direct control from the operator (i.e. the driver), so-called Self-Driving Cars (SDCs). A given SDC includes computer systems that can cause the SDC to accelerate, break, stop, change road lane and self-park.

A safe computer system may require planning a safe trajectory for the SDC based on the surroundings. The surrounding of the SDC may be highly dynamic as it may include objects (e.g., other vehicles including other two-wheeler, four-wheeler, or multi-wheeler vehicles, a person walking on the road or the like) which may already be in motion or begin to move when they are near to the SDC.

For example, "US 2020/0172093 A1" discloses probabilistic prediction for a motion of a lane-based surrounding vehicle and a longitudinal control method and apparatus using the same. The method includes obtaining surrounding vehicle information using a sensor, predicting a target lane of the surrounding vehicle based on the obtained surrounding vehicle information, performing future driving trajectory prediction for each target lane based on the surrounding vehicle information, and computing a probability of a collision likelihood based on a target lane and trajectory predictions of the surrounding vehicle in which future uncertainty has been taken into consideration and performing longitudinal control for collision avoidance.

"U.S. Pat. No. 10,173,685 B2" discloses a Control system, which is adapted for application in a vehicle and intended to detect following vehicles on the basis of environmental data which are obtained from one or several environmental sensors disposed on the vehicle and which reflect the area in front of, laterally next to, and/or behind the vehicle. The control system is adapted to detect a course of the own lane of the vehicle and to store it over a predefined road section, and to detect one or several other vehicles participating in traffic behind the own vehicle with the environmental sensors. A lane associated with each other vehicle, in which the other vehicle(s) drive(s), is detected, taking the stored course of the own lane into account. An occupancy of the own lane and/or of at least one adjacent lane by the other vehicle(s) is determined.

"U.S. Pat. No. 10,345,815 B2" discloses planning a motion for a first vehicle, comprising: estimating past states of an observed second vehicle based on sensor inputs; predicting a future trajectory of the second vehicle based on the estimated past states; planning a future trajectory of the first vehicle based on the predicted future trajectory of the second vehicle and a safety cost function; and driving the first vehicle to follow the planned trajectory.

One of the technical challenges in implementing the above computer systems is to perform a safe maneuver and while any avoiding collision of the SDC with the other objects.

SUMMARY

It is an object of the present technology to ameliorate at least some of the inconveniences present in the prior art. Embodiments of the present technology may provide and/or broaden the scope of approaches to methods of achieving the aims and objects of the present technology.

Developers of the present technology have realized that presence of objects travelling in the proximity of the SDC increase the risk of collision with the SDC. Therefore, it is desirable to use various sensor systems of the SDC to collect information regarding motion of dynamic objects and to analyze this data for determining estimated trajectories of these dynamic objects. This may allow considering the predicted trajectories of dynamic objects when controlling operation of the SDC to reduce the risk of collision between the SDC and one or more dynamic objects in its surroundings. To add a degree of freedom to accommodate various unavoidable scenarios on the road, the predicted trajectories are generated without considering the boundaries of the road lanes. Once, the predicted trajectories have been generated, the predicted trajectories are then mapped to the associated road lanes.

Hence, it can be said that in at least some embodiments of the present technology, the developers of the present technology have devised methods and devices for predicting a maneuver of at least one object, the at least one object being in a vicinity of the SDC and using the predicted maneuver of objects with the purpose of reducing risk of collisions between objects and the SDC.

In a first broad aspect of the present technology, there is provided a method of predicting a maneuver of at least one object, the at least one object being in a vicinity of a Self-Driving Car (SDC), the SDC being communicatively coupled to an electronic device, the method being executable by the electronic device, the method comprising:

receiving, by the electronic device, a section of a road map corresponding to surroundings of the SDC and the at least one object, the section of the road map including information about a plurality of road lanes; generating, by the electronic device, a plurality of predicted trajectories associated with the at least one object, each of the plurality of predicted trajectories including potential future location points of the at least one object on the section of the road map; for a given one of the plurality of predicted trajectories, mapping, by the electronic device, the potential future location points associated with the given one of the plurality of predicted trajectories on the section of the road map in accordance with the information about the plurality of road lanes; computing, by the electronic device, scores for each of the potential future location points associated with the given one of the plurality of predicted trajectories, the scores representing an association of a given potential future location point of the potential future location points with the plurality of road lanes at a future instance of time; computing, by the electronic device, an aggregated score from the scores corresponding to the given potential future location point of the potential future location points associated with the given one of the plurality of predicted trajectories; and based on the aggregated score, determining, by the electronic device, a predicted location within the plurality of road lanes of the at least one object at the future instance of time.

In some embodiments of the method, the information about the plurality of road lanes includes one or more of: a number of the plurality of road lanes in the section of the road map; geometrical properties of the plurality of road lanes, the geometrical properties of the plurality of road lanes includes one or more of: a width of each of the plurality of road lanes, a curvature of each of the plurality of road lanes; a number of exits on the section of the road map; a marking on the section of the road map indicating one or more of: a first indication of turning left or right, a second indication of an exit, a partitioning between the plurality of road lanes.

In some embodiments of the method, the section of the road map is a high definition (HD) map.

In some embodiments of the method, the plurality of predicted trajectories is generated without consideration of the plurality of road lanes on the section of the road map.

In some embodiments of the method, the plurality of predicted trajectories is based on movement data of the at least one object.

In some embodiments of the method, the mapping of the potential future location points on the section of the road map comprises mapping of the potential future location points associated with the given one of the plurality of predicted trajectories onto the plurality of road lanes.

In some embodiments of the method, wherein the mapping of the potential future location points on the section of the road map comprises generating a plurality of hypotheses, wherein a given hypothesis of the plurality of hypotheses represents a relationship of the given potential future location point of the potential future location points with the plurality of road lanes.

In some embodiments of the method, the aggregated score is computed as one or more of: a summation of the scores assigned to the given potential future location point associated with the given one of the plurality of predicted trajectories in accordance with the plurality of hypotheses; an average of the scores assigned to the given potential future location point associated with the given one of the plurality of predicted trajectories in accordance with the plurality of hypotheses.

In some embodiments of the method, the computing the score further comprises: assigning a first predetermined score to the given potential future location point if the given potential future location point and at least one of a next potential future location point and a previous potential future location point are located on a same road lane of the plurality of road lanes in which the given potential future location point is located; and assigning a second predetermined score to the given potential future location point if the given potential future location point is not located on a same road lane of the plurality of road lanes in which the next potential future location point or the previous potential future location point are located.

In some embodiments of the method, the first predetermined score is higher than the second predetermined score.

In some embodiments of the method, the method further comprises adjusting, by the electronic device, driving parameters of the SDC in accordance with the predicted location of the at least one object at the future instance of time.

In some embodiments of the method, the adjusting the driving parameters of the SDC includes one or more of: changing an acceleration of the SDC; changing a speed of the SDC; changing a direction of the SDC to change a road lane of the plurality of road lanes which the SDC is currently moving; changing the direction of the SDC to take a turn.

In some embodiments of the method, the SDC and the at least one object are moving in at least one of: a same direction; an opposite direction.

In some embodiments of the method, the computing the scores for each of the potential future location points comprises: using a machine learning algorithm (MLA), in which the potential future location points are used as input, and an output of the MLA are the scores corresponding to the given potential future location point of the potential future location points.

In some embodiments of the method, a higher aggregated score associated with the given potential future location point is a representative of a fact that the at least one object is unlikely to make rapid lane changes between sequential periods of time with a small time change increment therebetween; a lower aggregated score associated with the given potential future location point is a representative of unlikely zig-zagging behavior of the at least one object between sequential periods of time with the small time change increment therebetween.

In some embodiments of the method, the object is a dynamic object.

In some embodiments of the method, the predicted location is one of the potential future location points.

In some embodiments of the method, the predicted location being located at one or more of: an end of the given one of the plurality of predicted trajectories; a beginning of the given one of the plurality of predicted trajectories; a first future location point associated with the given one of the plurality of predicted trajectories located on a road lane of the plurality of road lanes in which the SDC is moving.

In a second broad aspect of the present technology, there is provided an electronic device for predicting a maneuver of at least one object, the at least one object being in a vicinity of a Self-Driving Car (SDC), the electronic device communicatively coupled to the SDC, the electronic device configured to: receive a section of a road map corresponding to surroundings of the SDC and the at least one object, the section of the road map including information about a plurality of road lanes; generate, a plurality of predicted trajectories associated with the at least one object, each of the plurality of predicted trajectories including potential future location points of the at least one object on the section of the road map; for a given one of the plurality of predicted trajectories, map the potential future location points associated with the given one of the plurality of predicted trajectories on the section of the road map in accordance with the information about the plurality of road lanes; compute scores for each of the potential future location points associated with the given one of the plurality of predicted trajectories, the scores representing an association of a given potential future location point of the potential future location points with the plurality of road lanes at a future instance of time; compute an aggregated score from the scores corresponding to the given potential future location point of the potential future location points associated with the given one of the plurality of predicted trajectories; and based on the aggregated score, determine a predicted location within the plurality of road lanes of the at least one object at the future instance of time.

In some embodiments of the electronic device, the electronic device generates the plurality of predicted trajectories without consideration of the plurality of road lanes on the section of the road map.

In the context of the present specification, a "server" is a computer program that is running on appropriate hardware and is capable of receiving requests (e.g. from client devices) over a network, and carrying out those requests, or causing those requests to be carried out. The hardware may be implemented as one physical computer or one physical computer system, but neither is required to be the case with respect to the present technology. In the present context, the use of the expression a "server" is not intended to mean that every task (e.g. received instructions or requests) or any particular task will have been received, carried out, or caused to be carried out, by the same server (i.e. the same software and/or hardware); it is intended to mean that any number of software elements or hardware devices may be involved in receiving/sending, carrying out or causing to be carried out any task or request, or the consequences of any task or request; and all of this software and hardware may be one server or multiple servers, both of which are included within the expression "at least one server".

In the context of the present specification, "electronic device" is any computer hardware that is capable of running software appropriate to the relevant task at hand. In the context of the present specification, the term "electronic device" implies that a device can function as a server for other electronic devices and client devices, however it is not required to be the case with respect to the present technology. Thus, some (non-limiting) examples of electronic devices include personal computers (desktops, laptops, netbooks, etc.), smart phones, and tablets, as well as network equipment such as routers, switches, and gateways. It should be understood that in the present context the fact that the device functions as an electronic device does not mean that it cannot function as a server for other electronic devices. The use of the expression "an electronic device" does not preclude multiple client devices being used in receiving/sending, carrying out or causing to be carried out any task or request, or the consequences of any task or request, or steps of any method described herein.

In the context of the present specification, "client device" is any computer hardware that is capable of running software appropriate to the relevant task at hand. In the context of the present specification, in general the term "client device" is associated with a user of the client device. Thus, some (non-limiting) examples of client devices include personal computers (desktops, laptops, netbooks, etc.), smart phones, and tablets, as well as network equipment such as routers, switches, and gateways It should be noted that a device acting as a client device in the present context is not precluded from acting as a server to other client devices. The use of the expression "a client device" does not preclude multiple client devices being used in receiving/sending, carrying out or causing to be carried out any task or request, or the consequences of any task or request, or steps of any method described herein.

In the context of the present specification, the expression "information" includes information of any nature or kind whatsoever capable of being stored in a database. Thus information includes, but is not limited to audiovisual works (images, movies, sound records, presentations etc.), data (location data, numerical data, etc.), text (opinions, comments, questions, messages, etc.), documents, spreadsheets, etc.

In the context of the present specification, the expression "software component" is meant to include software (appropriate to a particular hardware context) that is both necessary and sufficient to achieve the specific function(s) being referenced.

In the context of the present specification, the expression "computer information storage media" (also referred to as "storage media") is intended to include media of any nature and kind whatsoever, including without limitation RAM, ROM, disks (CD-ROMs, DVDs, floppy disks, hard drivers, etc.), USB keys, solid state-drives, tape drives, etc. A plurality of components may be combined to form the computer information storage media, including two or more media components of a same type and/or two or more media components of different types.

In the context of the present specification, a "database" is any structured collection of data, irrespective of its particular structure, the database management software, or the computer hardware on which the data is stored, implemented or otherwise rendered available for use. A database may reside on the same hardware as the process that stores or makes use of the information stored in the database or it may reside on separate hardware, such as a dedicated server or plurality of servers.

In the context of the present specification, the words "first", "second", "third", etc. have been used as adjectives only for the purpose of allowing for distinction between the nouns that they modify from one another, and not for the purpose of describing any particular relationship between those nouns. Thus, for example, it should be understood that, the use of the terms "first database" and "third server" is not intended to imply any particular order, type, chronology, hierarchy or ranking (for example) of/between the server, nor is their use (by itself) intended imply that any "second server" must necessarily exist in any given situation. Further, as is discussed herein in other contexts, reference to a "first" element and a "second" element does not preclude the two elements from being the same actual real-world element. Thus, for example, in some instances, a "first" server and a "second" server may be the same software and/or hardware components, in other cases they may be different software and/or hardware components.

Implementations of the present technology each have at least one of the above-mentioned objects and/or aspects, but do not necessarily have all of them. It should be understood that some aspects of the present technology that have resulted from attempting to attain the above-mentioned object may not satisfy this object and/or may satisfy other objects not specifically recited herein.

Additional and/or alternative features, aspects and advantages of implementations of the present technology will become apparent from the following description, the accompanying drawings and the appended claims.

BRIEF DESCRIPTION OF THE DRAWINGS

These and other features, aspects and advantages of the present technology will become better understood with regard to the following description, appended claims and accompanying drawings where:

DETAILED DESCRIPTION

Figure 1:
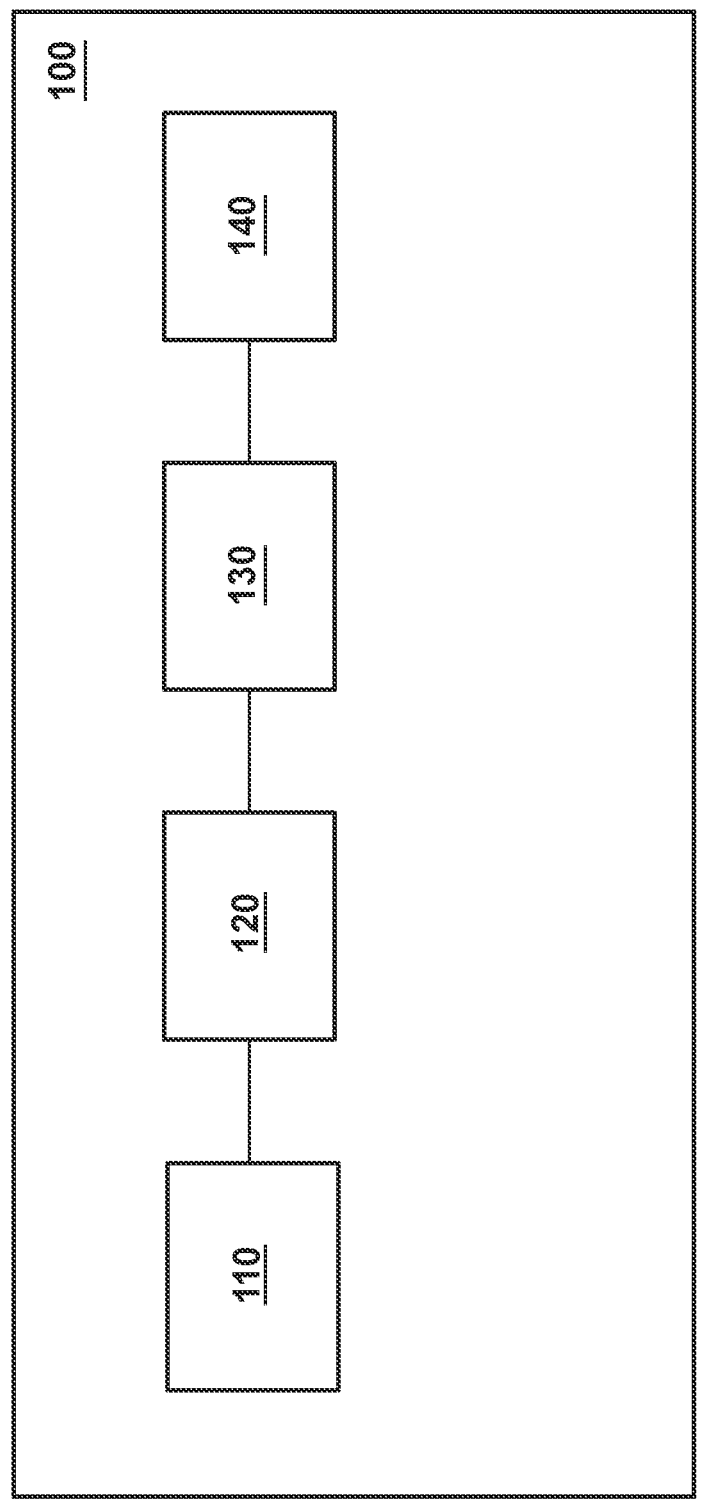
FIG. 1 depicts a schematic diagram of an example computer system for implementing certain embodiments of systems and/or methods of the present technology.

The examples and conditional language recited herein are principally intended to aid the reader in understanding the principles of the present technology and not to limit its scope to such specifically recited examples and conditions. It will be appreciated that those skilled in the art may devise various arrangements which, although not explicitly described or shown herein, nonetheless embody the principles of the present technology and are included within its spirit and scope.

Furthermore, as an aid to understanding, the following description may describe relatively simplified implementations of the present technology. As persons skilled in the art would understand, various implementations of the present technology may be of a greater complexity.

In some cases, what are believed to be helpful examples of modifications to the present technology may also be set forth. This is done merely as an aid to understanding, and, again, not to define the scope or set forth the bounds of the present technology. These modifications are not an exhaustive list, and a person skilled in the art may make other modifications while nonetheless remaining within the scope of the present technology. Further, where no examples of modifications have been set forth, it should not be interpreted that no modifications are possible and/or that what is described is the sole manner of implementing that element of the present technology.

Moreover, all statements herein reciting principles, aspects, and implementations of the technology, as well as specific examples thereof, are intended to encompass both structural and functional equivalents thereof, whether they are currently known or developed in the future. Thus, for example, it will be appreciated by those skilled in the art that any block diagrams herein represent conceptual views of illustrative circuitry embodying the principles of the present technology.

Similarly, it will be appreciated that any flowcharts, flow diagrams, state transition diagrams, pseudo-code, and the like represent various processes which may be substantially represented in computer-readable media and so executed by a computer or processor, whether or not such computer or processor is explicitly shown.

The functions of the various elements shown in the figures, including any functional block labelled as a "processor", may be provided through the use of dedicated hardware as well as hardware capable of executing software in association with appropriate software. When provided by a processor, the functions may be provided by a single dedicated processor, by a single shared processor, or by a plurality of individual processors, some of which may be shared.

Moreover, explicit use of the term "processor" or "controller" should not be construed to refer exclusively to hardware capable of executing software, and may implicitly include, without limitation, digital signal processor (DSP) hardware, network processor, application specific integrated circuit (ASIC), field programmable gate array (FPGA), read-only memory (ROM) for storing software, random access memory (RAM), and non-volatile storage. Other hardware, conventional and/or custom, may also be included.

Software modules, or simply modules which are implied to be software, may be represented herein as any combination of flowchart elements or other elements indicating performance of process steps and/or textual description. Such modules may be executed by hardware that is expressly or implicitly shown.

With these fundamentals in place, we will now consider some non-limiting examples to illustrate various implementations of aspects of the present technology.

Computer System

Referring initially to FIG. 1, there is depicted a computer system 100 suitable for use with some implementations of the present technology, the computer system 100 comprising various hardware components including one or more single or multi-core processors collectively represented by processor 110, a solid-state drive 120, a memory 130, which may be a random-access memory or any other type of memory. Communication between the various components of the computer system 100 may be enabled by one or more internal and/or external buses (not shown) (e.g. a PCI bus, universal serial bus, IEEE 1394 "Firewire" bus, SCSI bus, Serial-ATA bus, etc.), to which the various hardware components are electronically coupled.

In at least some embodiments of the present technology, the solid-state drive 120 stores program instructions suitable for being loaded into the memory 130 and executed by the processor 110 for determining a presence of an object. For example, the program instructions may be part of a vehicle control application executable by the processor 110.

In at least some embodiments of the present technology, it is contemplated that the computer system 100 may have additional and/or optional components, such as a network communication module 140 for communication, via a communication network (for example, a communication network 240 depicted in FIG. 2) with other electronic devices and/or servers, localization modules (not depicted), and the like.

Networked Computer Environment

Figure 2:
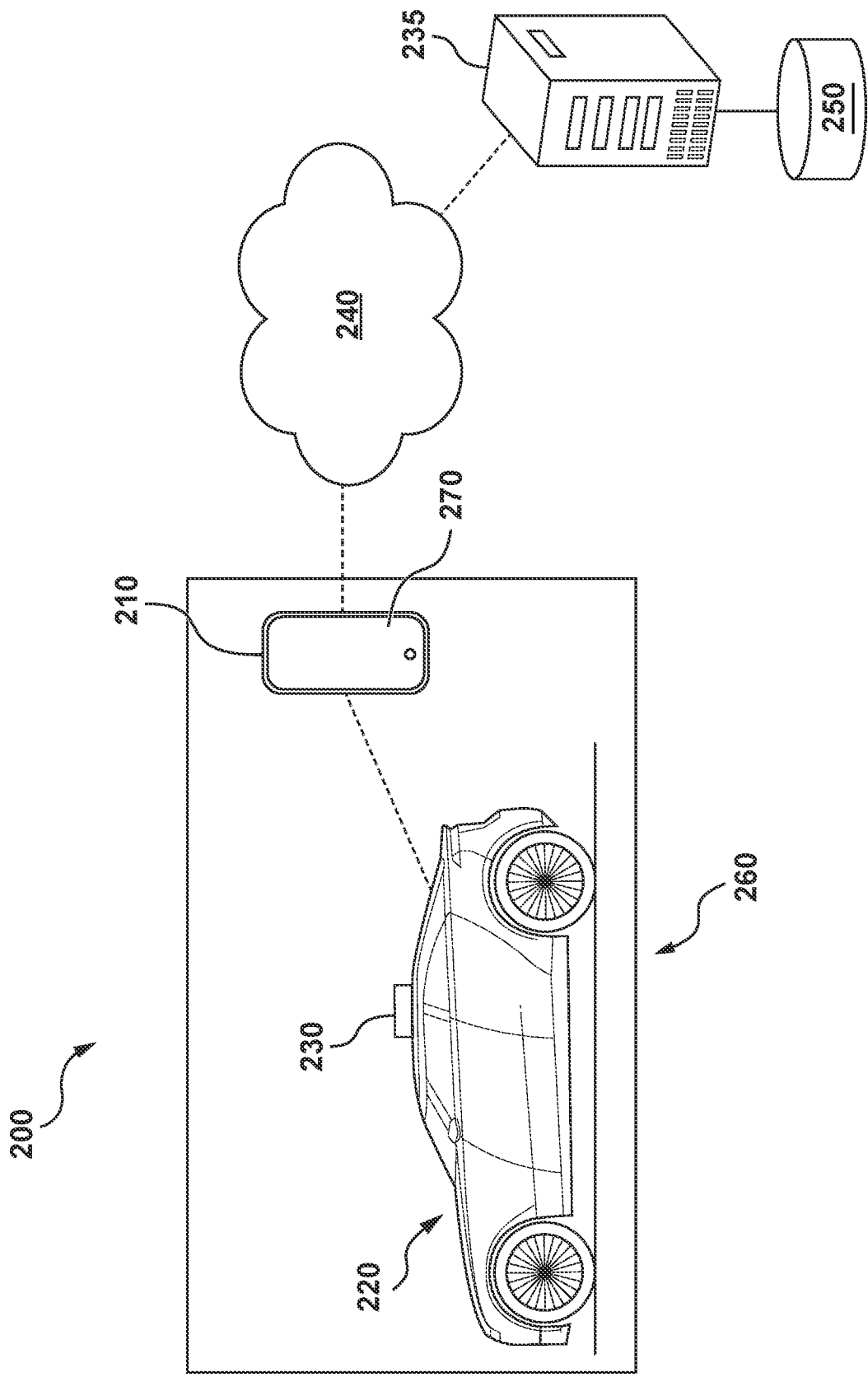
FIG. 2 depicts a networked computing environment suitable for use with some implementations of the present technology.

FIG. 2 illustrates a networked computer environment 200 suitable for use with some embodiments of the systems and/or methods of the present technology. The networked computer environment 200 comprises an electronic device 210 associated with a Self-Driving Car (SDC) 220, or associated with a user (not depicted) who can operate the SDC 220, a server 235 in communication with the electronic device 210 via the communication network 240 (e.g. the Internet or the like, as will be described in greater detail herein below). Optionally, the networked computer environment 200 can also include a GPS satellite (not depicted) transmitting and/or receiving a GPS signal to/from the electronic device 210. It will be understood that the present technology is not limited to GPS and may employ a positioning technology other than GPS. It should be noted that the GPS satellite can be omitted altogether.

The SDC 220, with which the electronic device 210 is associated, may comprise any leisure or transportation vehicle such as a private or commercial car, truck, motorbike or the like. The vehicle may be user operated or a driver-less vehicle. It should be noted that specific parameters of the SDC 220 are not limiting, these specific parameters including: vehicle manufacturer, vehicle model, vehicle year of manufacture, vehicle weight, vehicle dimensions, vehicle weight distribution, vehicle surface area, vehicle height, drive train type (e.g. 2× or 4×), tyre type, brake system, fuel system, mileage, vehicle identification number, and engine size.

The implementation of the electronic device 210 is not particularly limited, but as an example, the electronic device 210 may be implemented as a vehicle engine control unit, a vehicle CPU, a vehicle navigation device (e.g. TomTom™, Garmin™), a tablet, and a personal computer built into the SDC 220 and the like. Thus, it should be noted that the electronic device 210 may or may not be permanently associated with the SDC 220. Additionally or alternatively, the electronic device 210 can be implemented in a wireless communication device such as a mobile telephone (e.g. a smart-phone or a radio-phone). In certain embodiments, the electronic device 210 has a display 270.

The electronic device 210 may comprise some or all of the components of the computer system 100 depicted in FIG. 1. In certain embodiments, the electronic device 210 is on-board computer device and comprises the processor 110, solid-state drive 120 and the memory 130. In other words, the electronic device 210 comprises hardware and/or software and/or firmware, or a combination thereof, for determining a trajectory of the SDC 220 at a given section of the road considering obstacles therein, as will be described in greater detail below.

Sensor System

In the non-limiting embodiments of the present technology, the electronic device 210 comprises or has access to a sensor system 230. According to these embodiments, the sensor system 230 may comprise a plurality of sensors allowing for various implementations of the present technology. Examples of the plurality of sensors include but are not limited to: cameras, LIDAR sensors, and RADAR sensors, etc. The sensor system 230 is operatively coupled to the processor 110 for transmitting the so-captured information to the processor 110 for processing thereof, as will be described in greater detail herein below.

The sensor system 230 can be mounted on an interior, upper portion of a windshield of the SDC 220, but other locations are within the scope of the present disclosure, including on a back window, side windows, front hood, rooftop, front grill, or front bumper of the SDC 220. In some non-limiting embodiments of the present technology, the sensor system 230 can be mounted in a dedicated enclosure (not depicted) mounted on the top of the SDC 220.

Further, the spatial placement of the sensor system 230 can be designed taking into account the specific technical configuration thereof, configuration of the enclosure, weather conditions of the area where the SDC 220 is to be used (such as frequent rain, snow, and other elements) or the like.

In the non-limiting embodiments of the present technology, the sensor system 230 may comprise a sensor configured to capture an image of a surrounding area 260. In this regard the sensor system 230 may be a camera or a plurality thereof (not separately depicted).

How the camera is implemented is not particularly limited. For example, in one specific non-limiting embodiments of the present technology, the camera can be implemented as a mono camera with resolution sufficient to detect objects at pre-determined distances of up to about 30 m (although cameras with other resolutions and ranges are within the scope of the present disclosure).

In some embodiments of the present technology, the camera (or one or more cameras that make up the implementation of the sensor system 230) is configured to capture a pre-determine portion of the surrounding area 260 around the SDC 220. In some embodiments of the present technology, the camera is configured to capture an image (or a series of images) that represent approximately 90 degrees of the surrounding area 260 around the SDC 220 that are along a movement path of the SDC 220.

In other embodiments of the present technology, the camera is configured to capture an image (or a series of images) that represent approximately 180 degrees of the surrounding area 260 around the SDC 220 that are along a movement path of the SDC 220. In yet additional embodiments of the present technology, the camera is configured to capture an image (or a series of images) that represent approximately 360 degrees of the surrounding area 260 around the SDC 220 that are along a movement path of the SDC 220 (in other words, the entirety of the surrounding area around the SDC 220).

In a specific non-limiting example, the camera can be of the type available from FLIR Integrated Imaging Solutions Inc., 12051 Riverside Way, Richmond, BC, V6 W 1K7, Canada. It should be expressly understood that the camera can be implemented in any other suitable equipment.

In the non-limiting embodiments of the present technology, the sensor system 230 may further comprise a LIDAR instrument (not separately depicted). Lidar stands for Light Detection and Ranging. It is expected that a person skilled in the art will understand the functionality of the LIDAR instrument, but briefly speaking, a transmitter (not depicted) of the LIDAR sends out a laser pulse and the light particles (photons) are scattered back to a receiver (not depicted) of the LIDAR instrument. The photons that come back to the receiver are collected with a telescope and counted as a function of time. Using the speed of light ($\sim 3 \times 10^8$ m/s), the processor 110 can then calculate how far the photons have travelled (in the round trip). Photons can be scattered back off of many different entities surrounding the SDC 220, such as other particles (aerosols or molecules) in the atmosphere, other card, stationary objects or potential obstructions in front of the SDC 220.

In a specific non-limiting example, the LIDAR instrument comprised in the sensor system 230 can be implemented as the LIDAR based sensor that may be of the type available from Velodyne LiDAR, Inc. of 5521 Hellyer Avenue, San Jose, CA 95138, United States of America. It should be expressly understood that the LIDAR instrument can be implemented in any other suitable equipment.

In some embodiments of the present technology, the LIDAR instrument comprised in the sensor system 230 can be implemented as a plurality of LIDAR based sensors, such as three, for example, or any other suitable number.

In the non-limiting embodiments of the present technology, the sensor system 230 may further comprise a Radio Detection And Ranging (RADAR) instrument (not separately depicted). Briefly speaking, the RADAR instrument is a detection instrument using radio waves to determine a range, angle and/or velocity of objects. The RADAR instrument includes a transmitter producing electromagnetic waves, an antenna used for transmitting and receiving electromagnetic waves, a receiver, and a processor to determine properties of the detected objects.

In alternative embodiments of the present technology, there may be a separate antenna for receiving waves, and a separate antenna for transmitting waves. The processor used for determining properties of surrounding objects may be the processor 110.

In some embodiments of then present technology, the RADAR instrument used in the sensor system 230 may comprise long-range, medium-range and short-range RADAR sensors. As a non-limiting example, the long-range RADAR sensor may be used for adaptive cruise control, automatic emergency braking, and forward collision warning, while the medium and short-range RADAR sensors may be used for park assist, cross-traffic alert, junction assist, and blind side detection.

In a specific non-limiting example, the RADAR instrument comprised in the sensor system 230 may be of the type available from Robert Bosch GmbH of Robert-Bosch-Platz 1, 70839 Gerlingen, Germany. It should be expressly understood that the RADAR instrument can be implemented in any other suitable equipment.

In some non-limiting embodiments of the present technology, the sensor system 230 may be used, by the processor 110, for image calibration. For example, using an image captured by the camera and the LIDAR point cloud captured by the LIDAR instrument, the processor 110 is configured to identify a given region of the image to correspond to a given region of the LIDAR point cloud captured by the LIDAR instrument. In other embodiments of the present technology, the sensor system 230 is calibrated such that for the image captured by the camera, the LIDAR point cloud captured by the LIDAR instrument, and the RADAR data captured by the RADAR instrument, the processor 110 is configured to identify a given region of the image to correspond to a given region of the LIDAR point cloud and the RADAR data.

In the non-limiting embodiments of the present technology, the SDC 220 further comprises or has access to other sensors (not separately depicted). The other sensors include one or more of: an inertial measurement unit (IMU), a Global Navigation Satellite System (GNSS) instrument, ground speed RADARs, ultrasonic SONAR sensors, odometry sensors including accelerometers and gyroscopes, mechanical tilt sensors, magnetic compass, and other sensors allowing operation of the SDC 220.

As a non-limiting example, the IMU may be fixed to the SDC 220 and comprise three gyroscopes and three accelerometers for providing data on the rotational motion and linear motion of the SDC 220, which may be used to calculate motion and position of the SDC 220.

Communication Network

In some embodiments of the present technology, the communication network 240 is the Internet. In alternative non-limiting embodiments, the communication network 240 can be implemented as any suitable local area network (LAN), wide area network (WAN), a private communication network or the like. It should be expressly understood that implementations of the communication network 240 are for illustration purposes only. How a communication link (not separately numbered) between the electronic device 210 and the communication network 240 is implemented will depend inter alia on how the electronic device 210 is implemented. Merely as an example and not as a limitation, in those non-limiting embodiments of the present technology where the electronic device 210 is implemented as a wireless communication device such as a smartphone or a navigation device, the communication link can be implemented as a wireless communication link. Examples of wireless communication links include, but are not limited to, a 3G communication network link, a 4G communication network link, a 5G communication network link, and the like. The communication network 240 may also use a wireless connection with a server 235.

Server

In some embodiments of the present technology, the server 235 is implemented as a conventional computer server and may comprise some or all of the components of the computer system 100 of FIG. 1. In one non-limiting example, the server 235 is implemented as a Dell™ PowerEdge™ Server running the Microsoft™ Windows Server™ operating system, but can also be implemented in any other suitable hardware, software, and/or firmware, or a combination thereof. In the depicted non-limiting embodiments of the present technology, the server is a single server. In alternative non-limiting embodiments of the present technology (not shown), the functionality of the server 235 may be distributed and may be implemented via multiple servers.

In some non-limiting embodiments of the present technology, the processor 110 of the electronic device 210 can be in communication with the server 235 to receive one or more updates. The updates can be, but are not limited to, software updates, map updates, routes updates, weather updates, and the like.

In some embodiments of the present technology, the processor 110 can also be configured to transmit to the server 235 certain operational data, such as routes travelled, traffic data, performance data, and the like. Some or all data transmitted between the SDC 220 and the server 235 may be encrypted and/or anonymized.

Storage

In FIG. 2, there is also depicted a storage 250 communicatively coupled to the server 235. In some embodiments, however, the storage 250 may be communicatively coupled to the electronic device 210 and/or may be implemented within the electronic device 210 and/or may be communicatively coupled to any other processor of the networked computer environment 200.

In at least some embodiments, it is contemplated that the storage 250 may be used by the server 235, the electronic device 210 and/or any other processor of the networked computer environment 200 as a memory device for storing information. The storage 250 is configured to store information extracted, determined and/or generated by the processor 110 of the server 235 and/or the electronic device 210. Generally speaking, the storage 250 may receive data from the processor 110 which was generated by the processor 110 during processing for temporary and/or permanent storage thereof and may provide stored data to the processor 110 for use thereof. It is contemplated that the storage 250 may be split into several distributed storages, for providing a fault-tolerant storage system for example, without departing from the scope of the present technology.

It should be noted that in at least some embodiments of the present technology, the storage 250 may be implemented locally on the electronic device 210 and/or the server 235 (such as on a local memory, for example). It is also contemplated however that the storage 250 may be implemented remotely from the electronic device 210 and/or the server 235 (such as on a remote memory, for example).

Electronic Device

Figure 3:
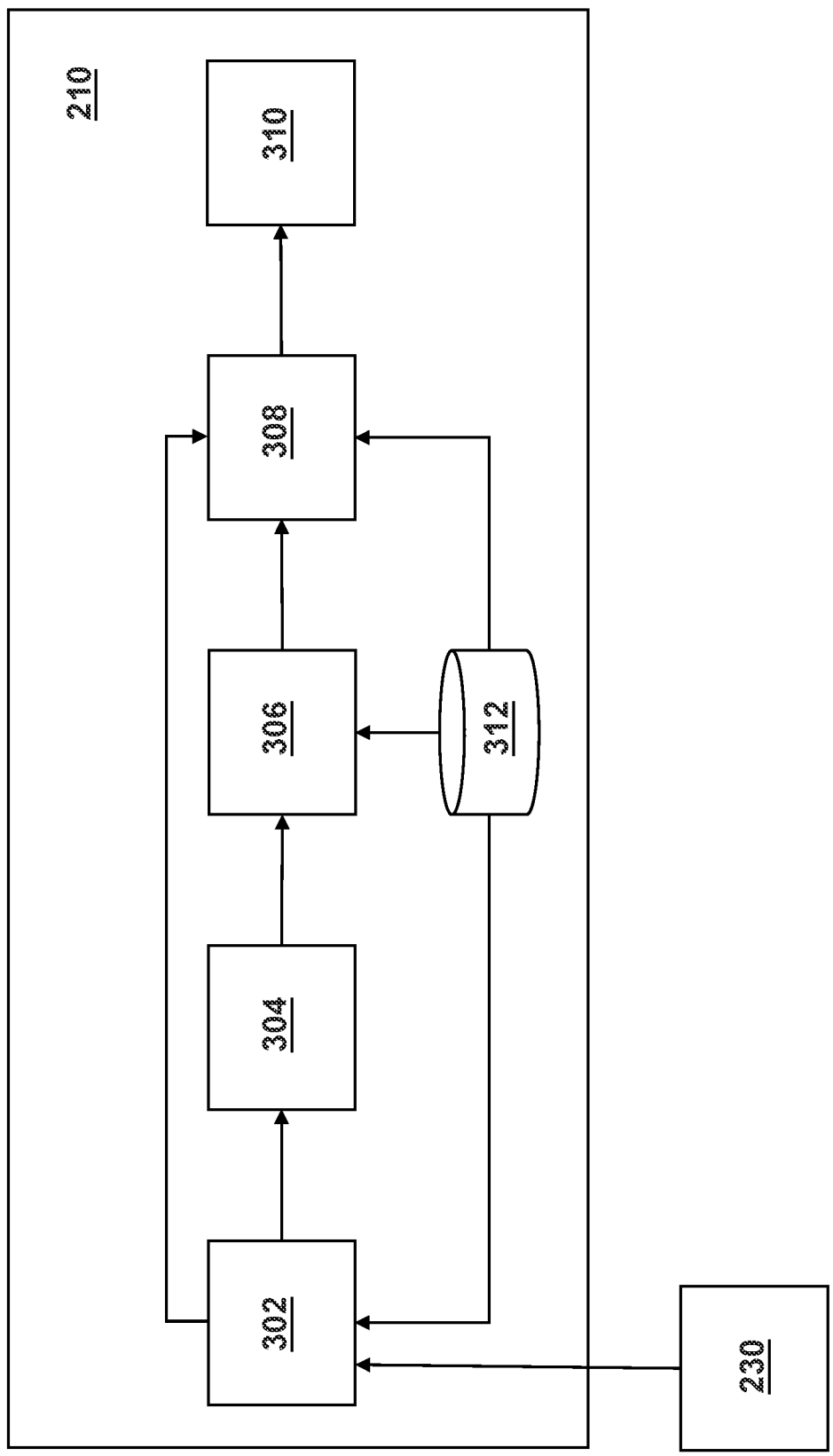
FIG. 3 depicts a schematic diagram of an electronic device for implementing various embodiments of the present technology.

FIG. 3 depicts a schematic diagram of the electronic device 210 for implementing various non-limiting embodiments of the present technology. The electronic device 210 may comprise one or more "modules" for performing a variety of data processing tasks. Some of the non-limiting modules may include a perception module 302, a trajectory prediction module 304 (for dynamic objects), a location prediction module 306 (for dynamic objects), a trajectory calculation module 308 (for the SDC 220), a movement planning module 310, and a road map database 312.

It is contemplated that an "object" may refer to any vehicle (e.g., another SDC, another human-operated vehicle, or the like), a bicycle, a person on the road, a person along with a pet on the road (in some cases a person holding a pet may be referred to as one object) or the like. Also, if the object is in motion, it may be referred to as a dynamic object; others may be referred to as static objects.

The illustrated connections among various modules in FIG. 3 are corresponding to some of the non-limiting embodiments of the present technology. Different modules may communicate with each other irrespective of the connections illustrated. It should be noted that the electronic device 210 may include additional components (such as those included in the computer system 100) and/or modules but have been obviated from FIG. 3 for the purpose of simplicity. It should be noted that each one of the non-exhaustive list of modules recited above may be embodied as one or more computer-implemented procedures that are configured to perform data processing and/or data generation as described herein. Alternatively, a given module may be a physical electronic device. Optionally, several modules (or all modules) may be implemented in a single electronic device.

The electronic device 210 may be configured to process the information acquired by the sensor system 230 about the surroundings of the SDC 220. As previously discussed, the sensor system 230 of the SDC 220 may include sensors (e.g., cameras, LIDAR sensors, and RADAR sensors, etc.) that are configured to acquire real-time information about the surroundings. The real-time information may include information related to an area in front of, laterally next to and/or behind the SDC 220. The sensor system 230 may continuously detect and track one or several objects in the vicinity of the SDC 220 in order to determine parameters about the driving situations of the objects. Some of the non-limiting parameters include, for example, a speed, difference in location as a function of time or the like.

In certain non-limiting embodiments, the sensor system 230 may provide the real-time information of the surroundings of the SDC 220 to the perception module 302. The perception module 302 may be configured to perform at least some data processing on the real-time information and may provide the processed data to the other modules of the electronic device 210. The perception module 302 may perform at least some data processing on the real-time information to determine, for example, number of objects currently in motion near the SDC 220, whether another object is moving, relative to the SDC 220, in a same or adjacent road lane, whether another object is moving, relative to the SDC 220, in a same or opposite direction, what speed or difference in speed in relation to the SDC 220 this object has, a steering information of the object or the like. It is contemplated that the above list is non-exhaustive and the perception module 302 may determine, extract or derive any suitable information about the surroundings of the SDC 220 by processing the real-time information.

In one non-limiting embodiment, the perception module 302 may provide the processed data to the trajectory prediction module 304. The trajectory prediction module 304 may be configured to predict a plurality of trajectories associated with the objects in the vicinity of the SDC 220. Each of the predicted trajectories (herein interchangeably referred to as plurality of predicted trajectories) may include potential future location points of the objects on a section of a road map as a function of time. The trajectory prediction module 304 may predict the plurality of trajectories associated with the at least one object based on movement data, which is indicative of kinematic characteristics (e.g., speed, acceleration, direction, angle or the like) of the objects, and based on road map which is indicative of various limitations of the section of the road, such as for example, traffic rules and road shape.

However, in at least some embodiments, the developers of the present technology have devised methods and devices that provide solutions in situations when the objects may be present in the vicinity of the SDC 220 and may pose a risk of collisions with the SDC 220. By way of example, if the section of the road in the vicinity of the SDC 220 is being occupied by a big sized truck and the section of the road ahead of the truck is curved. There is a high probability that the truck may occupy at least a portion of the road lane adjacent to the road lane in which the truck is currently moving. To this end, in various non-limiting embodiments of the present technologies, the plurality of trajectories associated with the objects may be predicted without consideration of the road lanes on the road. In doing so, the SDC 220 may have some additional degree of freedom for maneuver and may allow altering a current trajectory of the SDC 220 and/or to control operation of the SDC 220 such that in the above situations, the risk of collisions with objects is reduced.

It should be noted that the predicted trajectories may be associated with a "level of accuracy" since the predicted trajectories are of a probabilistic nature due to the prediction being made based on current movement data of the objects. Nevertheless, the predicted trajectories may be iteratively updated on the basis of the most current information about the objects and the section of the road gathered by the sensor system 230.

In certain non-limiting embodiments, the trajectory prediction module 304 may provide the plurality of predicted trajectories associated with the objects to the location prediction module 306. The location prediction module 306 may be configured to predict a location of the object at a future instance of time for a given one of the plurality of predicted trajectories. Operational details of the location prediction module 306 will be discussed later.

Based on the predicted location of the object, the operation/maneuvering of the SDC 220 may be controlled by triggering braking actions, steering actions, and/or acceleration actions. These actions may be triggered by the movement planning module 310 of the electronic device 210.

How the electronic device 210 may be configured to predict a location of the object within a plurality of road lanes at a future instance of time will now be discussed.

Method for Operating the Electronic Device

In various embodiments of the present technology, there is provided a method 400 of predicting a location of at least one object at a future instance of time. The method 400 may be executed while the SDC 220 is travelling along a section of the road. Various steps of the method 400 will now be described in greater details.

Step 402: Receiving a Section of a Road Map

The method 400 commences at step 402 where the electronic device 210 is configured to receive a section of a road map corresponding to surroundings of the SDC 220 and at least one object. The section of the road map including information about the plurality of road lanes and road rules associated with the section of the road map.

In certain non-limiting embodiments of the present technology, the electronic device 210 may communicate with the road map database 312 (as depicted in FIG. 3) to receive the section of road map and the associated information. In certain embodiments, the road map database 312 may be a part of the electronic device 210. While in other embodiments, the road map database 312 may be located external to the electronic device 210. By way of an example, the road map database 312 may be located on the storage 250 and the electronic device 210 may communicate with the road map database 312 via the server 235 using the communication network 240. It is contemplated that where the road map database 312 is located should not limit the scope of present technology.

In various non-limiting embodiments, the road map database 312 may include the road map and certain associated information. Such information may be associated with various sections of the road map. For a given section of the road map, some examples of the associated information may include a number of road lanes in the given section of the road map, geometrical properties of the road lanes (such as, a width of each road lane, a curvature of each road lane or the like), a number of exits on the section of the road map, a marking on the section of the road map indicating one or more of: an indication or turning left or right, an indication of an exit, a partitioning between the road. It is contemplated that the above list is non-exhaustive, and the information associated with the given section of the road map may include any other suitable information such as road signs etc. It is contemplated that in at least some non-limiting embodiments of the present technology, the associated information may be stored in a form of a road graph and/or in a form of a High-Definition (HD) road map.

In addition, the road map database 312 may include an indication of applicable road rule(s). Such road rules may be associated with various sections of the road map. For a given section of the road map, some examples of the road rules may include whether the given section of the map is a one way or two way road, if the given section of the map is a two way road, how many road lanes are dedicated for one way traffic, whether a road lane is a bicycle and/or pedestrian lane such that other vehicles may not be allowed, whether a road lane is dedicated to a particular type of vehicle, or the like. It is contemplated that the above list is non-exhaustive, and the road rules associated with the given section of the road map may include any other suitable rules. It is contemplated that in at least some non-limiting embodiments of the present technology, the road rule information may be stored in a form of a road graph and/or in a form of the HD road map.

In certain non-limiting embodiments, in order to receive the section of road map, the electronic device 210 may provide current GPS coordinates of the SDC 220 to the road map database 312. Based on the current GPS coordinates associated with the SDC 220, the road map database 312 may fetch the section of the road map accordingly and provide it the electronic device 210. In some non-limiting embodiments, the section of the road map provided as the HD map to the electronic device 210.

In some non-limiting embodiments, the perception module 302 associated with the electronic device 210 may communicate with the road map database 312 to fetch the section of the road map.

Figure 4:
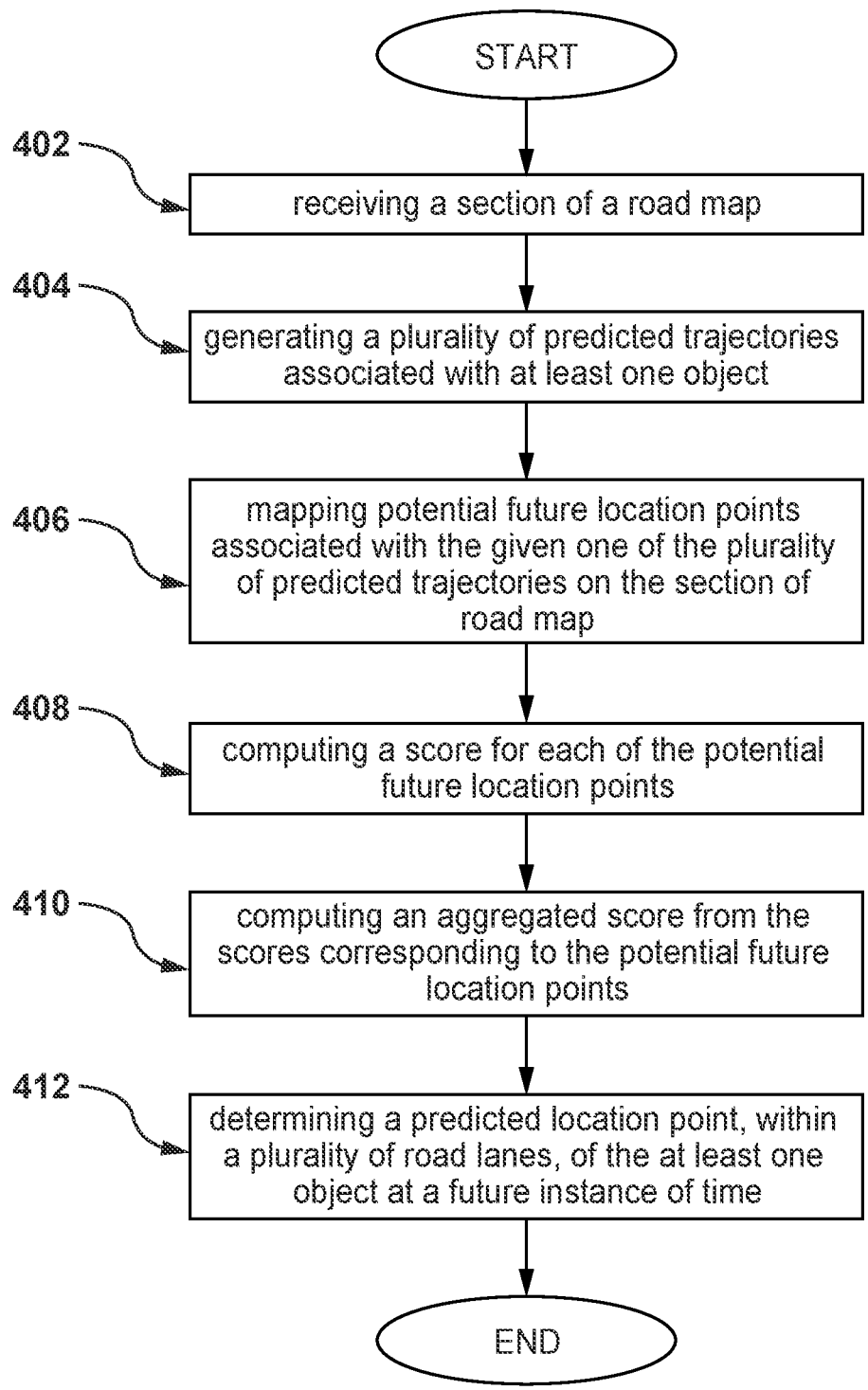
FIG. 4 is a schematic block diagram of a method of determining a location of at least one object, in accordance with various embodiments of the present technology.

Step 404: Generating a Plurality of Predicted Trajectories Associated with at Least One Object Returning to the description of FIG. 4, the method 400 advances to step 404 where the electronic device 210 generates a plurality of predicted trajectories associated with at least one object. As previously discussed, the trajectory prediction module 304 may be configured to generate the plurality of predicted trajectories.

Figure 5:
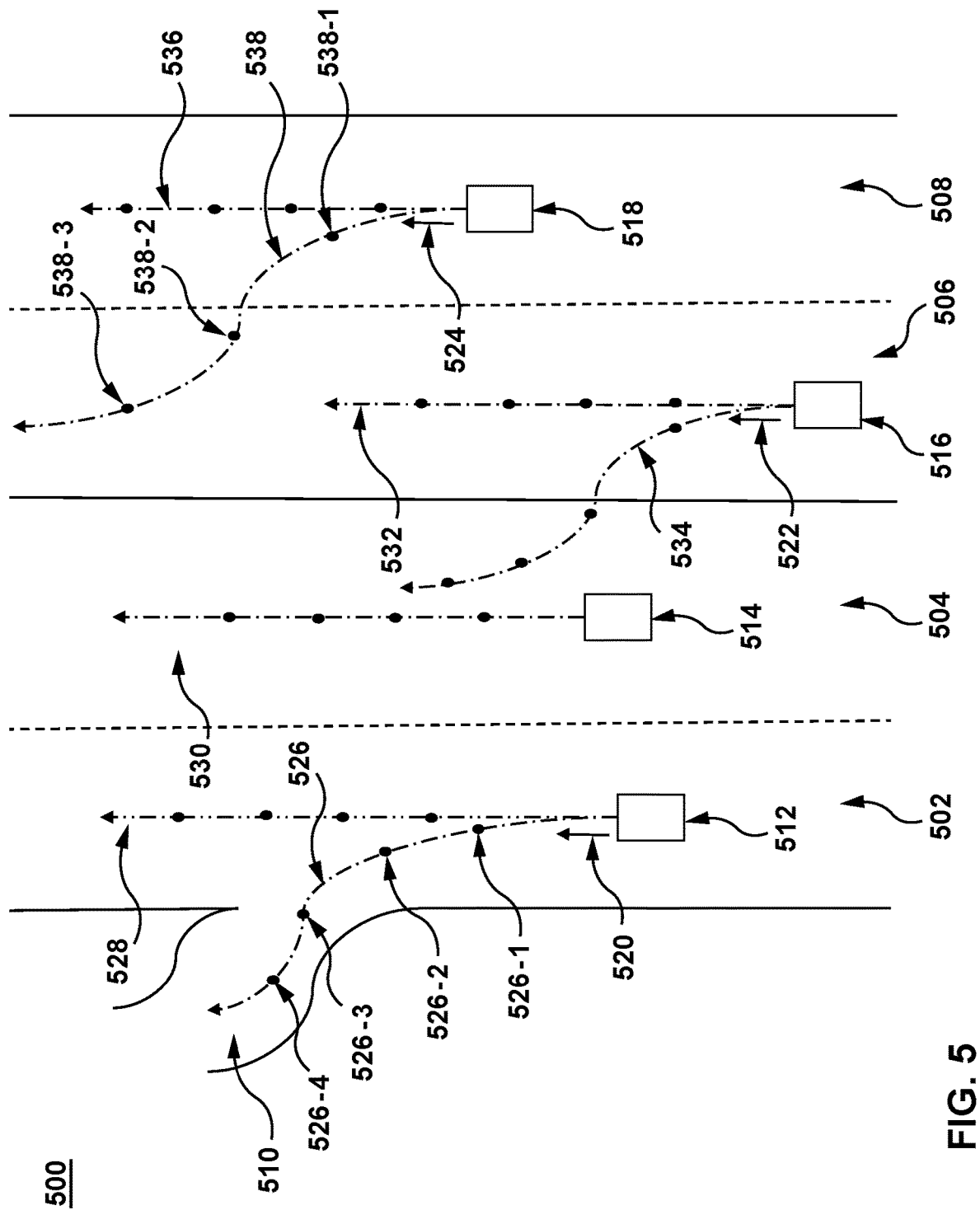
FIG. 5 depicts a section of the road map in a representative scenario used in various methods and processes, in accordance with various embodiments of the present technology.

With reference to FIG. 5, there is depicted a section of a road map 500 in a representative scenario, in accordance with various non-limiting embodiments of the present technology. There is depicted the section of the road map 500 having a plurality of road lanes 502, 504, 506, 508, and 510 separated by solid and dotted lines. The solid lines can be indicative of a prohibited road lane change and dotted lines can be indicative of an allowed road lane change. There is also depicted a representation 514 of the SDC 220 travelling in the road lane 504, which will be referred to as a current road lane of the SDC 220.

The section of the road map 500 has been illustrated as one-way road in which the objects and the SDC 220 may be allowed to drive in one direction. However, in various non-limiting embodiments of present technology, the section of the road map 500 may be a two-way road lane in with at least some of the objects may be driving in opposite direction. Different scenarios of the section of road map 500 including different types of road lanes and the direction of movement of the objects and the SDC 220 should not limit the scope of present technology.

The sensor system 230 may be configured to acquire information about the surroundings of the SDC 220. The perception module 302 may process the acquired information to identify various objects in the vicinity of the SDC 220. By way of example, in section of the road map 500, the identified objects by the perception module 302 may be represented as an object 512 associated with the road lane 502, an object 516 associated with the road lane 506, and an object 518 associated with the road lane 508.

Along with the identifying the objects 512, 516, 518, the perception module 302 may also be configured to determine the associated movement data. The movement data associated with the objects 512, 516, 518 are depicted as the movement data 520, 522, and 524 respectively. The movement data 520, 522, and 524 may be an indication of kinematic characteristics (e.g., speed, acceleration, direction, angle, location, position or the like) of the objects 512, 516, and 518 respectively.

Based on the movement data 520, 522, and 524, the trajectory prediction module 304 may be configured to predict a plurality of trajectories for each one of the objects 512, 516, and 518. Each of the predicted trajectories may include potential future location points of the respective objects 512, 516, and 518 on the section of road map 500. In order to do so, the trajectory prediction module 304 may executed a Machine Learning Algorithm (MLA), which has been trained to predict the trajectories of various objects based on their current state, their kinematic characteristics, the road information, and the like.

In order to have some additional degree of freedom and to consider different unavoidable scenarios on the section of the road map 500, the trajectory prediction module 304 may be configured to predict the plurality of trajectories for each one of the objects 512, 516, and 518 based on the respective movement data 520, 522, 524 and without the consideration of the boundaries of the plurality of road lanes 502, 504, 506, and 508. In other words, the trajectory prediction module 304 may be configured to predict the plurality of trajectories for each one of the objects 512, 516, and 518 based on the respective movement data 520, 522, 524 without considering which of the road lanes (the plurality of road lanes 502, 504, 506, and 508) the predicted trajectory will traverse or, in other words, be associated with.

The different unavoidable scenarios on the section of the road map 500 may include a road closure due to road repair/construction, an accident or the like, a road lane on the section of the road map 500 is being occupied by a big sized vehicle (such as a truck), and the road lane ahead of the truck being curved, such that, in order to follow the curvature of the road lane the truck may occupy a portion of the road lane adjacent to the road lane in which the truck is currently moving, a bicycle suddenly occupying a portion of the road lane which otherwise is prohibited for the bicycles, a traffic congestion, a pedestrian suddenly occupying a portion of the road lane which otherwise is prohibited for the pedestrians or any other non-limiting unavoidable scenario on the section of the road map 500.

With this said, for each one of the objects 512, 516, and 518, the trajectory prediction module 304 may predict the plurality of predicted trajectories in order to cover various scenarios with which the objects 512, 516, and 518 are moving on the section of the road map 500. Even though, the trajectory prediction module 304 may predict the plurality of predicted trajectories without consideration of the plurality of road lanes 502, 504, 506, and 508, yet while predicting the trajectories, the trajectory prediction module 304 may consider different exits and/or turns that the section of the road map 500 is having. In some examples, in addition to the movement data 520, 522, and 524 and different exits and/or turns, the trajectory prediction module 304 may also consider different indications (e.g., a turn left or turn right indication) from the objects 512, 516, and 518. In yet another example, the trajectory prediction module 304 may also consider different real-time unavoidable scenarios (as discussed above) on the section of the road map 500 to predict the plurality of trajectories.

By way of example, for the object 512, the trajectory prediction module 304 may have predicted the associated predicted trajectories 526 and 528. The predicted trajectory 526 may be related to a scenario where based on the movement data 520, it is determined, by the trajectory prediction module 304, that the object 512 may intend to change a road lane from the road lane 502 to road lane 510 to take the exit. Similarly, the predicted trajectory 528 may be related to a scenario where based on the movement data 520, it is determined, by the trajectory prediction module 304, that the object 512 may continue to move along the road lane 502.

In another example, for the object 516, the trajectory prediction module 304 may have predicted associated trajectories 532 and 534. The predicted trajectory 532 may be related to a scenario where based on the movement data 522, it is determined, by the trajectory prediction module 304, that the object 516 may continue to move along the road lane 506. Similarly, the predicted trajectory 534 may be related to a scenario where the road lane 506 ahead of the object 516 may be closed due to construction or accident. To this end, based on the movement data 522 it is determined, by the trajectory prediction module 304, that the object 516 may intend to change a road lane from the road lane 506 to the road lane 504, even though such a maneuver is not allowed or is temporarily allowed due to construction or accident. In a similar manner, the predicted trajectories 536 and 538 may be associated with the object 518. The predicted trajectory 538 may represent a scenario where the object 518 has been predicted to take left turn.

In certain non-limiting embodiments, in order to predict a trajectory (e.g., the predicted trajectory 526), the trajectory prediction module 304 may determine a distance horizon (or a "prediction horizon"). For example, the distance horizon may be 200 m long—which means that the first 200 m from the object (e.g., the object 512) may be taken into account to predict the trajectory (e.g., the predicted trajectory 526). Also, the distance horizon may include a "sub-step". For example, the distance horizon may further be indicative of a sub-set of 0.25 m—which means that the first 200 m of the reference path may be split into smaller sections via potential future location points separated by a distance of 0.25 m. In some non-limiting embodiments of the present technology, the prediction horizon can be implemented as a "lane path" horizon.

In certain non-limiting embodiments, alternatively or in addition to distance horizon, the trajectory prediction module 304 may determine a timeline horizon. For example, the timeline horizon may be of 20 s—which means that the next 20 s of the object's (e.g., the object 512) movement may be taken into account to predict the trajectory (e.g., the predicted trajectory 526). Also, the timeline horizon may include a "sub-step". For example, the timeline horizon may further be indicative of a sub-set of 0.1 s—which means that the next 20 s of the object's (e.g., the object 512) movement to be split into smaller sections via future instances of time separated by 0.1 s.

It is contemplated that the distance horizon and the timeline horizon discussed above are merely representative examples and in different scenarios the distance horizons, the timeline horizons including the sub-steps may depend on various factors for example a speed with which the SDC 220 and/or the objects (e.g., the objects 512, 516, and 518) are moving, a traffic on the section of the road map 500, an unobstructed visibility of the section of the road map 500 or the like.

By way of example, if the section of the road map 500 is associated with a "Highway", the distance horizon and the associated sub-steps may be more as compare to a scenario where the section of the road map 500 is associated with a "Local Street", as for the Highways, in most cases the road may be unobstructed for a larger distance. Similarly, if the section of the road map 500 is associated with a "Highway", the timeline horizon and the associated sub-steps may be smaller as compare to a scenario where the section of the road map 500 is associated with a "Local Street", as for the local streets, most likely the objects (e.g., the objects 512, 516, 518) may be moving with a lower speed as compare to the speed of the objects (e.g., the objects 512, 516, 518) on the highways.

As previously discussed, each one of the pluralities of predicted trajectories (e.g., the predicted trajectory 526) may include potential future location points. In one example, the predicted trajectory 526 may include potential future location points 526-1, 526-2, 526-3, and 526-4 representing possible future locations of the object 512 at various future instances of time. The potential future location points 526-1, 526-2, 526-3, and 526-4 may represent possible future location of the object 512 at time $t_1$, $t_2$, $t_3$, and $t_4$ respectively. In a similar manner, each one each one of the plurality of predicted trajectories (e.g., 526) may include potential future location points where a first potential future location point (e.g., 526-1) associated with a given predicted trajectory (e.g., 526) may be closer to the object (e.g., 512) and the last potential future location point (e.g., 526-4) associated with the given trajectory (e.g., 526) may be farther from the object (e.g. 512).

It is to be noted and as has been alluded to above, in certain non-limiting embodiments, the trajectory prediction module 304 may use a machine learning algorithm (MLA) to predict the plurality of trajectories. The input to the MLA may include the movement data (e.g., the movement data 520, 522, 524) and the output of the MLA may be the plurality of predicted trajectories (e.g., the predicted trajectories 526, 528.).

Step 406: Mapping Potential Future Location Points Associated with the Given One of the Pluralities of Predicted Trajectories on the Section of Road Map With continued reference to FIG. 4, the method 400 advances to step 406 where, for a given one of the plurality predicted trajectories (e.g., the predicted trajectory 526), the electronic device 210 maps the potential future location points (e.g., the potential future location points 526-1, 526-2, 526-3, and 526-4) on the section of road map 500, in accordance with the information about the plurality of road lanes (e.g., the plurality of road lanes 502, 504, 506, and 508).

As noted above, the information about the plurality of road lanes (e.g., the plurality of road lanes 502, 504, 506, and 508) may include geometrical properties such as width of each road lane, curvature of each road lane, or the like, a marking on the section of the road map indicating, an indication of an exit, a partitioning between the road lanes represented by solid and dotted lines. Also, in certain non-limiting embodiments, the section of the road map 500 may be represented as HD maps or graphs.

Based on the information about the plurality of road lanes (e.g., the plurality of road lanes 502, 504, 506, and 508), the electronic device 210 (and more specifically, the location prediction module 306) may be configured to map the potential future location points (e.g., the potential future location points 526-1, 526-2, 526-3, and 526-4) associated with the given trajectory (e.g., the predicted trajectory 526) on the section of road map 500. Referring to FIGS. 3 and 5, in certain non-limiting embodiments, the location prediction module 306 may access the section of road map 500 from the road map database 312. Further, the location prediction module 306 may associate the potential future location points (e.g., the potential future location points 526-1, 526-2, 526-3, and 526-4) on the plurality of road lanes (e.g., the plurality of road lanes 502, 504, 506, and 508) by determining in which road lane a given future location point is being located. By way of example, the location prediction module 306 may map the potential future location points 526-1 and 526-2 on the road lane 502 and may map the potential future location points 526-3 and 526-4 on the road lane 510.

In a similar manner, the location prediction module 306 may map the potential future location points associated with the predicted trajectory 528 on the road lane 502, map the potential future location points associated with the predicted trajectory 532 on the road lane 506, map the first two potential future location points associated with the predicted trajectory 534 on the road lane 506 and the remaining two potential future location points associated with predicted trajectory 534 on the road lane 504. Also, the location prediction module 306 may map the potential future location points associated with the predicted trajectory 536 on the road lane 508. Regarding the predicted trajectory 538, the location prediction module 306 may map (or, in a sense, project) the potential future location points 538-1 and 538-2 on the road lane 508 and the potential future location points 538-3 on the road lane 504.

In some non-limiting embodiments of the present technology, prior to mapping the given predicted trajectory (e.g., the predicted trajectory 538) on the road lanes 504, 506, and 508, the location prediction module 306 may be configured to analyze the association between the given predicted trajectory (e.g., the predicted trajectory 538) and the road lanes 504, 506, and 508. To this end, the location prediction module 306 may generate several hypotheses for determining the association (e.g., relationship) between the potential future location points of the given predicted trajectory (e.g., the predicted trajectory 538) and one or more road lanes 504, 506, 508 at the given point in time.

Figure 6:
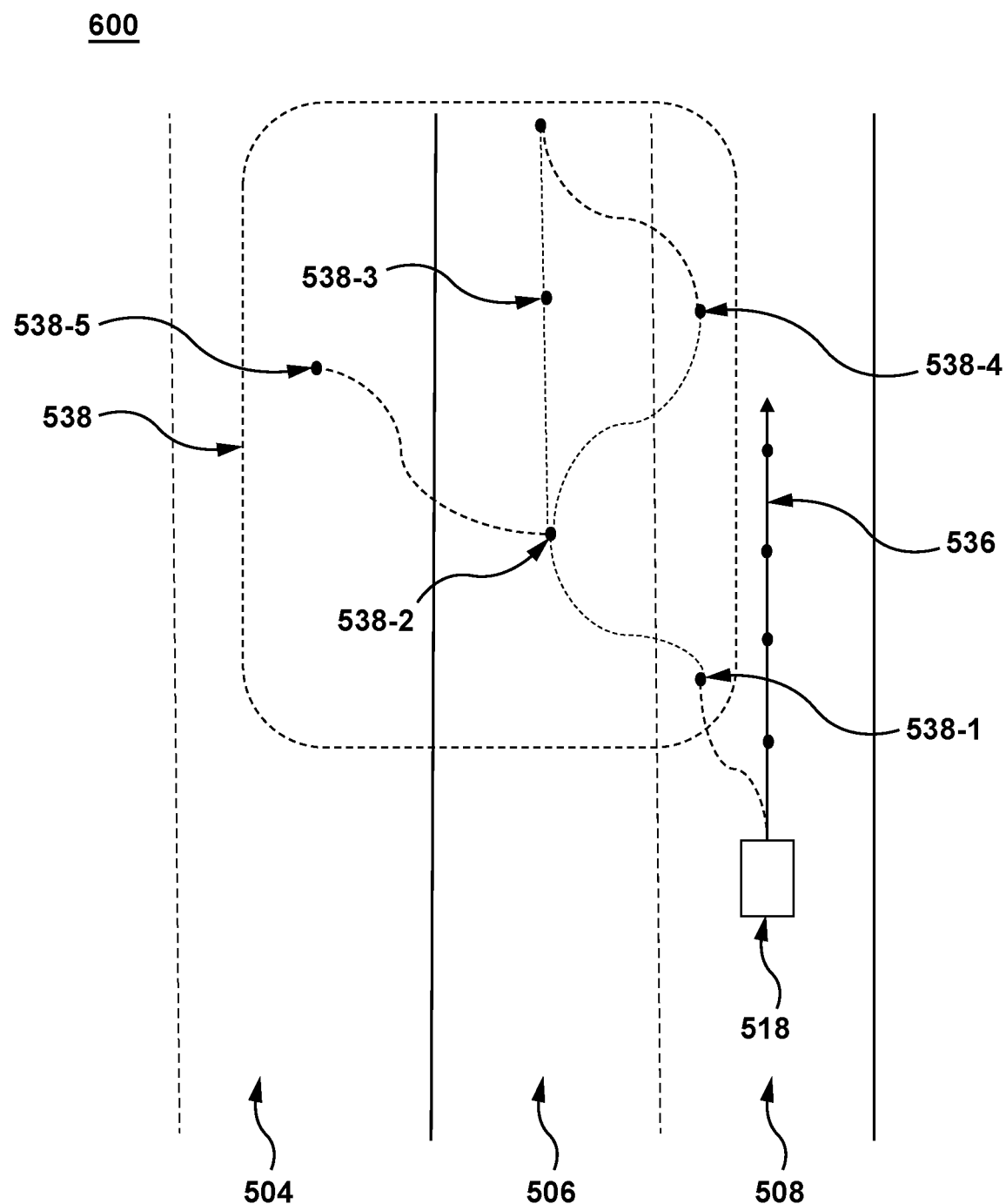
FIG. 6 depicts a portion of the section of the road map used in various methods and processes, in accordance with various non-limiting embodiments of present technology.

Referring to FIG. 6, which depicts a portion 600 of the section of the road map 500 with road lanes 504, 506, and 508 and the object 518, in accordance with various non-limiting embodiments of present technology. For the purpose of simplicity of the illustration, other objects 512 and 516, and the SDC 220 have been omitted from FIG. 6. In one example, it is assumed that the object 518 was initially moving along the predicted trajectory 536, however, due to unavoidable scenarios (as previously discussed), the object 518 may intend to deviate from its current trajectory (e.g., the predicted trajectory 536). To this end, in certain embodiments, the location prediction module 306 may predict various potential future location points, for example, potential future location points 538-1, 538-2, 538-3, 538-4, and 538-5 along with the associated hypotheses.

The associated hypotheses may represent an association (e.g., relationship) of the potential future location points (e.g., the potential future location point 538-1, 538-2, 538-3, 538-4, and 538-5) with the road lanes 504, 506, and 508. By way of an example, for the potential future location point 538-2, the location prediction module 306 may generate a first hypothesis that the next potential future location point (e.g., potential future location point 538-3) may fall on the same road lane 506, a second hypothesis that the next potential future location point (e.g., potential future location point 538-4) may fall on the adjacent road lane (e.g., the road lane 508), and a third hypothesis that the next potential future location point (e.g., potential future location point 538-4) may fall on the adjacent road lane (e.g., the road lane 504).

It is to be noted that, in various non-limiting embodiments, the electronic device 210 may store the given one of the plurality of predicted trajectories (e.g., the predicted trajectory 538), the associated potential future location points (e.g., the potential future location points 538-1, 538-2, 538-3, 538-4, and 538-5) and various hypotheses and the mapping of the potential future location points on the section of the road map 500 in a memory (e.g., memory 130).

Step 408: Computing a Score for Each of the Potential Future Location Points

Returning to FIG. 4, the method 400 advances to step 408 where, the electronic device 210 computes scores for each of the potential future location points (e.g., the potential future location points 526-1, 526-2, 526-3, and 526-4) associated with the given one of the plurality of predicted trajectories (e.g., the predicted trajectory 526), the scores representing an association of a location point with the plurality of road lanes at a future instance of time.

Referring to FIGS. 3 and 5, in certain non-limiting embodiments of the present technology, the electronic device 210 (location prediction module 306) may analyze each of the potential future location points (e.g., the potential future location points 526-1, 526-2, 526-3, and 526-4) associated with the given one of the plurality of predicted trajectories (e.g., the predicted trajectory 526) in order to determine how risky a potential future location point could be w.r.t the SDC 220.

To this end, in certain non-limiting embodiments, prior to the potential future location points, the location prediction module 306 may determine a road lane in which the SDC 220 is currently moving. In certain embodiment, the location prediction module 306 may rely on a positioning technology (e.g., GPS) to determine a current location of the SDC 220. Alternatively, or in addition to the location prediction module 306, in certain non-limiting embodiments, the location prediction module 306 may rely on the output of at least some of the sensors in the sensor system 230 (e.g., cameras) to determine with which road lane associated with the section of the road map 500 the SDC 220 is currently moving.

Once, the road lane in which the SDC 220 is moving (for example, the road lane 504 in FIG. 5) is determined, the location prediction module 306 may then analyze each one of the plurality of predicted trajectories (e.g., the predicted trajectories 526, 528, 532 . . . ) associated with the objects (e.g., the objects 512, 516, and 518).

In some of the non-limiting embodiments, the location prediction module 306 may select one of the of the plurality of predicted trajectories (e.g., the predicted trajectories 526, 528, 532 . . . ) and the associated hypotheses. By way of example, the location prediction module 306 selects the predicted trajectory 538. The location prediction module 306 may than assign predetermined scores to the associated potential future location points 538-1, 538-2, 538-3, 538-4, and 538-5 based on various hypotheses.

The assigning of the predetermined score to a current potential future location points (e.g., the potential future location point 538-2) may be based on analyzing various hypotheses of an association of next potential future location point (e.g., the potential future location points 538-3, 538-4, or 538-5) and previous potential future location point (e.g., the potential future) with the road lanes (e.g., the road lanes 504, 506, and 508).

In certain non-limiting embodiments, the location prediction module 306 may assign the predetermined score to a first potential future location point (e.g., the potential future location point 538-1) based on an association of the next potential future location point (e.g., the potential future location point 538-2) and the object (e.g., the object 518) with the road lanes (e.g., the road lanes 506 and 508). In accordance with one hypothesis, if the first potential future location point (e.g., the potential future location point 538-1) is located on a same road lane (e.g., the road lane 508) in which the object (e.g., the object 516) is currently moving and the next potential future location point (e.g., the potential future location point 538-2) is located on the same road lane (e.g., the road lane 508) or on the adjacent road lane (e.g., the road lane 506), the location prediction module 306 may assign a first predetermined score to the first potential future location point (e.g., the potential future location point 538-1).

The first predetermined score may be representative of the fact that the object (e.g., the object 518) is unlikely to make rapid lane changes between sequential periods of time with a small time change increment therebetween.

In a similar manner, the location prediction module 306 may assign the predetermined scores to the potential future location point (e.g., the potential future location point 538-2) based on an association of its previous potential future location point (e.g., the potential future location point 538-1) and various hypotheses of associations of different potential future location point (e.g., the potential future location point 538-3, 538-4, 538-5) with the with the road lanes (e.g., the road lanes 504, 506, and 508).

In accordance with another hypothesis, if the next potential future location point (e.g., the potential future location point 538-3) is located on a same road lane (e.g., the road lane 506) in which the current potential future location point (e.g., the potential future location point 538-2) is located and the previous potential future location point (e.g., the potential future location point 538-1) is located on the same road lane (e.g., the road lane 506) or on an adjacent road lane (e.g., the road lane 508), the location prediction module 306 may assign the first predetermined score to the current potential future location point (e.g., the potential future location point 538-2). Since, this would again be a representative of the fact that the object (e.g., the object 518) is unlikely to make rapid lane changes between sequential periods of time with a small-time change increment therebetween.

However, in accordance with another hypothesis, if the next potential future location point (e.g., the potential future location point 538-4 or 538-5) is located on an adjacent road lane (e.g., the road lane 504 or 506) and the previous potential future location point (e.g., the potential future location point 538-1) is also located on the adjacent road lane (e.g., the road lane 508), the location prediction module 306 may assign a second predetermined score to the current potential future location point (e.g., the potential future location point 538-2).

The second predetermined score may represent an unlikely zig-zagging behavior of the object 518 between sequential periods of time with a small time change increment therebetween (and therefore such hypothesis is less likely to be true).

To this end, in certain non-limiting embodiments, the first predetermined score may have a higher value than the second predetermined score. In another example, the first predetermined score may be a positive value and the second predetermined value may be a negative value.

Further, to each potential future location points (e.g., the potential future location points 538-1, 538-2, 538-3, 538-4, and 538-5) associated with the given predicted trajectory (e.g., the predicted trajectory 538), the location prediction module 306 may be configured to assign the first predetermined score in addition to or alternatively the second predetermined based on various associated hypotheses. By way of an example, the potential future location points 538-2 may be assigned three predetermined scores based on three different hypotheses. In first hypothesis, at least the next potential future location point 538-3 falls on same road lane 506 as that of the potential future location points 538-2, thus the assigned predetermined score is the first predetermined score. For second and third hypotheses, the next potential future location points 538-4 and 534-5 fall on different road lanes 504 and 508 respectively as well as the previous potential future location point 538-1 falls on a different road lane 508. To this end, for second and third hypotheses, the potential future location points 538-2 may be assigned with the second predetermined score.

It is contemplated that the example depicted in FIG. 6 is merely for the representation purposes and any suitable scoring technique to penalize different hypotheses resulting in unlikely zig-zagging behavior of the object 518 between sequential periods of time with a small time change increment therebetween may be used without departing from the present techniques.

In various non-limiting embodiments, alternatively or in addition to the above discussed technique for computing the scores for each of the potential future location points (e.g., the potential future location points 538-1, 538-2, 538-3, 538-4, and 538-5) associated with the given one of the plurality of predicted trajectories (e.g., the predicted trajectory 538), the electronic device 210 may rely on a MLA, in which the potential future location points (e.g., the potential future location points 538-1, 538-2, 538-3, 538-4, and 538-5) may be supplied as an input to the MLA and an output of the MLA may the scores for each of the potential future location points (e.g., the potential future location points 538-1, 538-2, 538-3, 538-4, and 538-5).

It is contemplated that the location prediction module 306 may be configured to store the scores assigned to the potential future location points associated with the plurality of predicted trajectories in a memory (e.g., memory 130) in such a manner that the scores associated with each of the plurality of predicted trajectories may be accessible for further processing.

Step 410: Computing an Aggregated Score from the Scores Corresponding to the Potential Future Location Points Returning to FIG. 4, the method 400 advances to step 410 where, the electronic device 210 computes an aggregated score from the scores corresponding to the potential future location points (e.g., the potential future location points 538-1, 538-2, 538-3, 538-4, and 538-5) associated with the given one of the plurality of predicted trajectories (e.g., the predicted trajectory 538) for various hypotheses.

Referring to FIGS. 3 and 5, in certain non-limiting embodiments of the present technology, the electronic device 210 (more particularly the location prediction module 306) may aggregate the scores assigned to each of the potential future location points (e.g., the potential future location points 538-1, 538-2, 538-3, 538-4, and 538-5) associated with the given one of the plurality of predicted trajectories (e.g., the predicted trajectory 526) in order to compute the aggregated score.

A higher aggregated score associated with a given potential future location point (e.g., the potential future location point 538-2) may be representative of the fact that the object (e.g., the object 518) is unlikely to make rapid lane changes. Similarly, a lower aggregated score associated with a given potential future location point (e.g., the potential future location point 538-4) may represent an unlikely zig-zagging behavior of the object 518 (and therefore such scenarios are less likely to be true). To this end, in certain non-limiting embodiments, the potential future location points (e.g., the potential future location point 538-1, 538-2, and 538-3) associated with the given predicted trajectory (e.g., the predicted trajectory 538) having higher aggregated scores are associated with the respective road lanes (e.g., the road lanes 506 and 508), as being based on more "realistic" hypothesis.

In certain non-limiting embodiments, the location prediction module 306 may be configured to compute a summation of the scores assigned to each of the potential future location points (e.g., the potential future location points 538-1, 538-2, 538-3, 538-4, and 538-5) associated with the given one of the plurality of predicted trajectories (e.g., the predicted trajectory 526) and the summation may represent the aggregated score.

In another non-limiting embodiment, the location prediction module 306 may be configured to compute an average of the scores assigned to each of the potential future location points (e.g., the potential future location points 538-1, 538-2, 538-3, 538-4, and 538-5) associated with the given one of the plurality of predicted trajectories (e.g., the predicted trajectory 526) and the average may represent the aggregated score. Without limiting the scope of the present disclosure, the average may be mean, median or mode of the scores.

Step 412: Determining a Predicted Location Point, within a Plurality of Road Lanes, of the at Least One Object at a Future Instance of Time Returning to FIG. 4, the method 400 advances to the final step 412 where, based on the aggregated score, the electronic device 210 determines a predicted location of the at least one object within the plurality of road lanes at the future instance of time.

Referring to FIGS. 3 and 5, in certain non-limiting embodiments, the electronic device 210 (more particularly the location prediction module 306) may be configured to determine predicted locations of the object (e.g., the object 516) within the plurality of road lanes (e.g., the plurality of road lanes 502, 504, 506, and 508) at the future instance of time based on the associations of the potential future location points (e.g., the potential future location points 538-1, 538-2, 538-3,) of the given predicted trajectory (e.g., the predicted trajectory 538) with the road lane (e.g., the road lanes 506 and 508).

In some non-limiting embodiments, the predicted location may be one of the potential future location points. In some non-limiting embodiments, the predicted location may be located at the end of the given one of the plurality of predicted trajectories (e.g., the predicted trajectories 528, 532, 534, 538). In some other non-limiting embodiments, the predicted location may be located at the beginning of the given one of the plurality of predicted trajectories (e.g., the predicted trajectories 528, 532, 534, 538).

It is contemplated that for a safe maneuver of the SDC 220, a minimal safety distance from the objects (e.g., the objects 512, 516 and 518) may be required. In certain non-limiting embodiments, such safety distance may be either predefined or set as a function of velocity of the SDC 220 and of the other objects (e.g., the objects 512, 516 and 518). It is highly likely that an object (not depicted) moving on the same road lane (e.g., 514) in which the SDC 220 is currently moving changes its kinematic characteristics due to which a distance between such objects and the SDC 220 may get reduced.

Also, in certain cases, if the objects (e.g., the objects 512, and 516) are moving on road lanes (e.g., the plurality of road lanes 502 and 506) adjacent to the road lane (e.g., the road lane 504) in which the SDC 220 is currently moving, it is highly likely that such objects (e.g., the objects 512, and 516) may intend to change their respective road lane (e.g., the plurality of road lanes 502 and 506) to the road lane (e.g., the road lane 504) in which the SDC 220 is currently moving due to which a distance between such objects and the SDC 220 may get reduced.

To this end, in certain embodiments, the location prediction module 306 may determine the predicted location which may be a first future location point associated with the given one of the plurality of predicted trajectories (e.g., the predicted trajectory 534) located on the road lane (e.g., the road lane 504) in which the SDC 220 is currently moving.

In certain non-limiting embodiments, for each of the plurality of predicted trajectories, the location prediction module 306 may store the aggregated scores, the potential future location points along with their future instances of time, and the associations of the potential future location points with the plurality of road lanes in a memory (e.g., memory 130) in such a manner that it may be accessible for further processing.

In certain non-limiting embodiments, the trajectory calculation module 308 may determine a given trajectory of the SDC 220 on the section of the road, which reduces the risk of collision between the SDC 220 and the objects (e.g., the objects 512, 516, 518) on the section of the road. It is contemplated that in some embodiments, in order to determine this collision-risk-reducing trajectory for the SDC 220 on the section of the road, the electronic device 210 may use, the potential future location points along with their future instances of time, and the potential future location points with the plurality of road lanes on the section of the road.

In certain non-limiting embodiments, the trajectory calculation module 308 may be configured to determine a reference path 530 for the SDC 220 in the current road lane (e.g., the road lane 504). It should be noted that the reference path 530 may sometimes be referred as a "default" reference path of the SDC 220, since, it is assumed that in normal conditions the SDC 220 is ought to travel along the center line of the current road lane (e.g., the road lane 504) by default. Indeed, developers of the present technology have realized that in normal conditions, such as for example when the SDC 220 is travelling along a straight lane, the SDC 220 ought to be travelling along the center line of that current road lane (e.g., the road lane 504) for safety purposes.

In one example, if the SDC 220 is intended to be travelling along the reference path 530, the trajectory calculation module 308 may continuously observe the potential future location points along with their future instances of time and the associations potential future location points with the plurality of road lanes (e.g., the plurality of road lanes 502, 504, 506, 508) on the section of the road map 500. In case, one or more objects (e.g., the object 516, 518) are determined to be entering the current road lane (e.g., the road lane 504) in which the SDC 220 is travelling, the trajectory calculation module 308 may intimate the movement planning module 310.

Based on the predicted location of the objects (e.g., the objects 516 and 518) at the future instance of time, entering the current road lane (e.g., the road lane 504), the movement planning module 310 may adjust one or more driving parameters of the SDC 220. In so doing, the movement planning module 310 may trigger braking actions, steering actions, speed action and/or acceleration actions. Such triggering may result in changing an acceleration of the SDC 220, changing a speed of the SDC 220, changing a direction of the SDC 220 to change a road lane in which the SDC 220 is currently moving, changing a direction of the SDC to take a turn, or the like.

In another example, if the SDC 220 is intended to change the current road lane (e.g., the road lane 504), in order to change a trajectory of the SDC, the trajectory calculation module 308 may analyze the potential future location points along with their future instances of time and the associations of potential future location points with the plurality of road lanes (e.g., the plurality of road lanes 502, 504, 506, 508) on the section of the road map 500 corresponding to different objects (e.g., the objects 512, 516, 518) and then predict a trajectory for the SDC 220. In so doing, the trajectory calculation module 308 make sure that it is safe for the SDC 220 to maneuver and that there may be a safe distance between the objects (e.g., the objects 512, 516, 518) and the SDC 220.

It should be expressly understood that not all technical effects mentioned herein need to be enjoyed in each and every embodiment of the present technology.

Modifications and improvements to the above-described implementations of the present technology may become apparent to those skilled in the art. The foregoing description is intended to be exemplary rather than limiting. The scope of the present technology is therefore intended to be limited by the scope of the appended claims.

What is claimed is:

1. A method of predicting a maneuver of at least one object, the at least one object being in a vicinity of a Self-Driving Car (SDC), the SDC being communicatively coupled to an electronic device, the method being executable by the electronic device, the method comprising:
   receiving, by the electronic device,
      a section of a road map corresponding to surroundings of the SDC and the at least one object, the section of the road map including information about a plurality of road lanes;
   generating, by the electronic device,
      a plurality of predicted trajectories associated with the at least one object, each of the plurality of predicted trajectories including potential future location points of the at least one object on the section of the road map, the plurality of predicted trajectories being generated without consideration of the plurality of road lanes on the section of the road map;
   for a given one of the plurality of predicted trajectories,
      mapping, by the electronic device, the potential future location points associated with the given one of the plurality of predicted trajectories on the section of the road map in accordance with the information about the plurality of road lanes;
      computing, by the electronic device, scores for each of the potential future location points associated with the given one of the plurality of predicted trajectories, the scores representing an association of a given potential future location point of the potential future location points with the plurality of road lanes at a future instance of time, wherein computing the scores comprises assigning a first predetermined score to the given potential future location point if the given potential future location point and a previous potential future location point are located on a same road lane of the plurality of road lanes and assigning a second predetermined score to the given potential future location point if the given potential future location point and the previous potential future location point are not located on the same road lane of the plurality of road lanes;
      computing, by the electronic device, an aggregated score from the scores corresponding to the given potential future location point of the potential future location points associated with the given one of the plurality of predicted trajectories; and based on the aggregated score, determining, by the electronic device, a predicted location within the plurality of road lanes of the at least one object at the future instance of time, and based on the predicted location of the at least one object:
changing an acceleration of the SDC; or
changing a speed of the SDC; or
changing a direction of the SDC to change a road lane of the plurality of road lanes in which the SDC is currently moving; or
changing the direction of the SDC to take a turn.

2. The method of claim 1, wherein the information about the plurality of road lanes includes one or more of:
a number of the plurality of road lanes in the section of the road map;
geometrical properties of the plurality of road lanes, the geometrical properties of the plurality of road lanes includes one or more of:
a width of each of the plurality of road lanes,
a curvature of each of the plurality of road lanes;
a number of exits on the section of the road map;
a marking on the section of the road map indicating one or more of:
a first indication of turning left or right,
a second indication of an exit,
a partitioning between the plurality of road lanes.

3. The method of claim 1, wherein the section of the road map is a high definition (HD) map.

4. The method of claim 1, wherein the plurality of predicted trajectories are based on movement data of the at least one object.

5. The method of claim 1, wherein the mapping of the potential future location points on the section of the road map comprises mapping of the potential future location points associated with the given one of the plurality of predicted trajectories onto the plurality of road lanes.

6. The method of claim 1, wherein the mapping of the potential future location points on the section of the road map comprises generating a plurality of hypotheses, wherein a given hypothesis of the plurality of hypotheses represents a relationship of the given potential future location point of the potential future location points with the plurality of road lanes.

7. The method of claim 6, wherein the aggregated score is computed as one or more of:
a summation of the scores assigned to the given potential future location point associated with the given one of the plurality of predicted trajectories in accordance with the plurality of hypotheses;
an average of the scores assigned to the given potential future location point associated with the given one of the plurality of predicted trajectories in accordance with the plurality of hypotheses.

8. The method of claim 1, wherein the first predetermined score is higher than the second predetermined score.

9. The method of claim 1, wherein the SDC and the at least one object are moving in at least one of:
a same direction;
an opposite direction.

10. The method of claim 1, wherein the computing the scores for each of the potential future location points comprises:
using a machine learning algorithm (MLA), in which the potential future location points are used as input, and an output of the MLA are the scores corresponding to the given potential future location point of the potential future location points.

11. The method of claim 1, wherein
a higher aggregated score associated with the given potential future location point is representative of a fact that the at least one object is unlikely to make rapid lane changes between sequential periods of time with a small time change increment therebetween;
a lower aggregated score associated with the given potential future location point is representative of unlikely zig-zagging behavior of the at least one object between sequential periods of time with the small time change increment therebetween.

12. The method of claim 1, wherein the object is a dynamic object.

13. The method of claim 1, wherein the predicted location is one of the potential future location points.

14. The method of claim 1, wherein the predicted location is being located at one or more of:
an end of the given one of the plurality of predicted trajectories;
a beginning of the given one of the plurality of predicted trajectories;
a first future location point associated with the given one of the plurality of predicted trajectories located on a road lane of the plurality of road lanes in which the SDC is moving.

15. An electronic device for predicting a maneuver of at least one object, the at least one object being in a vicinity of a Self-Driving Car (SDC), the electronic device communicatively coupled to the SDC, the electronic device configured to:
receive a section of a road map corresponding to surroundings of the SDC and the at least one object, the section of the road map including information about a plurality of road lanes;
generate, a plurality of predicted trajectories associated with the at least one object, each of the plurality of predicted trajectories including potential future location points of the at least one object on the section of the road map, the plurality of predicted trajectories being generated without consideration of the plurality of road lanes on the section of the road map;
for a given one of the plurality of predicted trajectories, map the potential future location points associated with the given one of the plurality of predicted trajectories on the section of the road map in accordance with the information about the plurality of road lanes;
compute scores for each of the potential future location points associated with the given one of the plurality of predicted trajectories, the scores representing an association of a given potential future location point of the potential future location points with the plurality of road lanes at a future instance of time, wherein computing the scores comprises assigning a first predetermined score to the given potential future location point if the given potential future location point and a previous potential future location point are located on a same road lane of the plurality of road lanes and assigning a second predetermined score to the given potential future location point if the given potential future location point and the previous potential future location point are not located on the same road lane of the plurality of road lanes;

compute an aggregated score from the scores corresponding to the given potential future location point of the potential future location points associated with the given one of the plurality of predicted trajectories; and based on the aggregated score, determine a predicted location within the plurality of road lanes of the at least one object at the future instance of time, and based on the predicted location of the at least one object:
instruct the SDC to change an acceleration of the SDC; or
instruct the SDC to change a speed of the SDC; or
instruct the SDC to change a direction of the SDC to change a road lane of the plurality of road lanes in which the SDC is currently moving; or
instruct the SDC to change the direction of the SDC to take a turn.

16. The electronic device of claim 15, wherein the information about the plurality of road lanes includes one or more of:
a number of the plurality of road lanes in the section of the road map;
geometrical properties of the plurality of road lanes, the geometrical properties of the plurality of road lanes includes one or more of:
a width of each of the plurality of road lanes,
a curvature of each of the plurality of road lanes;
a number of exits on the section of the road map;
a marking on the section of the road map indicating one or more of:
a first indication of turning left or right,
a second indication of an exit,
a partitioning between the plurality of road lanes.

17. The electronic device of claim 15, wherein the section of the road map is a high definition (HD) map.

18. A method of predicting a maneuver of at least one object, the at least one object being in a vicinity of a Self-Driving Car (SDC), the SDC being communicatively coupled to an electronic device, the method being executable by the electronic device, the method comprising:
receiving, by the electronic device,
a section of a road map corresponding to surroundings of the SDC and the at least one object, the section of the road map including information about a plurality of road lanes;

generating, by the electronic device,
a plurality of predicted trajectories associated with the at least one object, each of the plurality of predicted trajectories including potential future location points of the at least one object on the section of the road map, the plurality of predicted trajectories being generated without consideration of the plurality of road lanes on the section of the road map;

for a given one of the plurality of predicted trajectories,
mapping, by the electronic device, the potential future location points associated with the given one of the plurality of predicted trajectories on the section of the road map in accordance with the information about the plurality of road lanes;

computing, by the electronic device, scores for each of the potential future location points associated with the given one of the plurality of predicted trajectories, the scores representing an association of a given potential future location point of the potential future location points with the plurality of road lanes at a future instance of time, wherein computing the scores comprises assigning a first predetermined score to the given potential future location point if the given potential future location point and a next potential future location point are located on a same road lane of the plurality of road lanes and assigning a second predetermined score to the given potential future location point if the given potential future location point and the next potential future location point are not located on the same road lane of the plurality of road lanes;

computing, by the electronic device, an aggregated score from the scores corresponding to the given potential future location point of the potential future location points associated with the given one of the plurality of predicted trajectories; and based on the aggregated score, determining, by the electronic device, a predicted location within the plurality of road lanes of the at least one object at the future instance of time, and based on the predicted location of the at least one object:
changing an acceleration of the SDC; or
changing a speed of the SDC; or
changing a direction of the SDC to change a road lane of the plurality of road lanes in which the SDC is currently moving; or
changing the direction of the SDC to take a turn.

* * * * *